United States Patent [19]

Suzuki et al.

[11] Patent Number: 4,473,882
[45] Date of Patent: Sep. 25, 1984

[54] CONTROL METHOD OF AND SYSTEM FOR AUTOMATIC TRANSMISSION FOR AUTOMOTIVE VEHICLE

[75] Inventors: Tadashi Suzuki; Yoshiro Morimoto; Hideo Hamada, all of Yokosuka; Masaaki Suga, Yokohama; Masaaki Futagi, Yokosuka, all of Japan

[73] Assignee: Nissan Motor Co., Ltd., Yokohama, Japan

[21] Appl. No.: 291,846

[22] Filed: Aug. 10, 1981

[30] Foreign Application Priority Data

| Aug. 11, 1980 | [JP] | Japan | 55-109139 |
| Aug. 27, 1980 | [JP] | Japan | 55-116926 |
| Sep. 26, 1980 | [JP] | Japan | 55-133005 |
| Sep. 26, 1980 | [JP] | Japan | 55-133006 |

[51] Int. Cl.³ .................. G05D 29/00; B60K 41/08; F16D 25/12
[52] U.S. Cl. .................. 364/424.1; 74/866; 74/872; 192/0.033; 192/3.31
[58] Field of Search .............. 364/421.1; 74/865, 866, 74/867; 192/0.033, 3.3, 3.31

[56] References Cited

U.S. PATENT DOCUMENTS

| 3,693,478 | 9/1972 | Malloy | 74/645 |
| 3,744,347 | 7/1973 | Kubo et al. | 74/866 |
| 3,857,302 | 12/1974 | Morris | 192/3.3 |
| 3,985,046 | 10/1976 | Morris et al. | 192/3.31 |
| 4,262,335 | 4/1981 | Ahlen et al. | 364/424.1 |
| 4,308,764 | 1/1982 | Kawamoto et al. | 74/866 X |
| 4,314,487 | 2/1982 | Ahlen | 74/865 |
| 4,350,234 | 9/1982 | Suga et al. | 74/866 X |
| 4,373,619 | 2/1983 | Schritt et al. | 74/866 X |
| 4,382,496 | 5/1983 | Yamamori et al. | 192/3.3 |
| 4,386,687 | 6/1983 | Chevalier et al. | 192/0.033 |

FOREIGN PATENT DOCUMENTS

| 2933527 | 6/1980 | Fed. Rep. of Germany . |
| 2469313 | 5/1981 | France . |
| 55-69353 | 5/1980 | Japan . |
| 55-103149 | 8/1980 | Japan . |
| 55-109853 | 8/1980 | Japan . |
| 55-109854 | 8/1980 | Japan . |
| 1523544 | 9/1978 | United Kingdom . |

*Primary Examiner*—Felix D. Gruber
*Attorney, Agent, or Firm*—Schwartz, Jeffery, Schwaab, Mack, Blumenthal & Koch

[57] ABSTRACT

An automatic transmission is changed from the highest gear ratio to the next lower gear ratio upon depressing the brake pedal after the accelerator has been released to cause the automotive vehicle to begin a coasting operation as long as the engine speed is higher than a predetermined engine speed. As a result the engine speed increases, resulting in an increase in the time period when the engine speed remains above the predetermined engine speed to enhance the time period of the operation of fuel cut means, thereby improving fuel economy.

33 Claims, 24 Drawing Figures

CONTROL METHOD OF AND SYSTEM FOR AUTOMATIC TRANSMISSION FOR AUTOMOTIVE VEHICLE

BACKGROUND OF THE INVENTION

1. Field of the Invention

The present invention relates to a control method of and control system for an automatic transmission for an automotive vehicle. The automotive vehicle has an engine which is provided with a fuel supply cut-off signal generating means for generating a fuel cut signal as long as the engine speed is higher than a predetermined engine speed after the accelerator pedal has been released to cause the automotive vehicle to begin a coasting operation and also with a fuel supply cut-off means responsive to the fuel supply cut-off signal for suspending the supply of fuel to the engine.

2. Description of the Prior Art

Engine having a fuel supply cut-off have been developed to suspend the supply of fuel (hereinafter called a fuel cut-off) upon release of the accelerator pedal to cause the vehicle to begin a coasting operation at an engine speed higher than a predetermined engine speed (for example, a 1250 rpm during normal operation) for prevention of exhaust gas emission and for enhancement of fuel economy because under this vehicle operating condition, combustion within the engine (the power of the engine) is not required. The arrangement is such that if, during the coasting operation, the engine speed drops to a certain predetermined engine speed (for example, 1000 rpm during normal operation) below which the engine could not be restarted even if the supply of fuel is resumed, the fuel supply cut-off is released to resume the supply of fuel so as to cause the engine to operate again. Subsequently, if the vehicle decends a long slope with an intermediate gear ratio being selected, the engine speed increases even during coasting operation and if the engine speed value increases to a certain engine speed (for example, 2200 rpm during normal operation), fuel cut-off is resumed.

Vehicles which have an automatic transmission and an engine equipped with a fuel supply cut-off means of this kind are capable of running by transmitting the power from said engine to traction wheels via the automatic transmission. Since many automatic transmissions include a torque converter in its power transmission system, it can not establish non-slip drive connection between the engine and traction wheels when the magnitude of driven power, viz., the power transmitted from the traction wheels to the engine, is relatively small during coasting operation so that upon releasing the accelerator pedal to cause the automotive vehicle to begin a coasting operation, a drop in the engine speed is rapid as compared to that encountered in an automotive vehicle having a manual transmission. Thus, a problem exists in that the engine may stall upon depressing a brake pedal for emergency stopping of the automotive vehicle. Hence, it is the common practice that in the case of the automotive vehicle having an automatic transmission, the fuel must be resupplied at a relatively high engine speed value as compared to the automotive vehicle having a manual transmission.

As explained above, the engine speed drops at a fast rate in the automotive vehicle having an automatic transmission during a coasting operation of the vehicle because the torque converter of the automatic transmission can not transmit a torque from the traction wheels to the engine fully. Thus, the time period when the engine speed remains above the predetermined engine speed and the engine runs without the supply of fuel is short.

SUMMARY OF THE INVENTION

An object of the present invention is to provide a control method of and system for an automatic transmission wherein the time period of the fuel cut-off operation is increased so as to improve fuel economy.

According to the present invention, a brake pedal position is detected for generating a brake signal when the brake pedal is depressed, a downshift command signal is generated responsive to the brake signal when a fuel supply cut-off means suspends the supply of fuel to the engine, and the automatic transmission is changed from the high gear ratio down to the next lower adjacent gear ratio. As a result, the automatic transmission downshifts to increase the engine speed, resulting in an increase in the time period when the engine speed remains above a predetermined engine speed to increase the time period of the operation of the fuel supply cut-off thereby improving fuel economy.

BRIEF DESCRIPTION OF THE DRAWINGS

The invention will be more apparent from the following description and drawings, in which.

DESCRIPTION OF THE PREFERRED EMBODIMENTS

Figure 1:
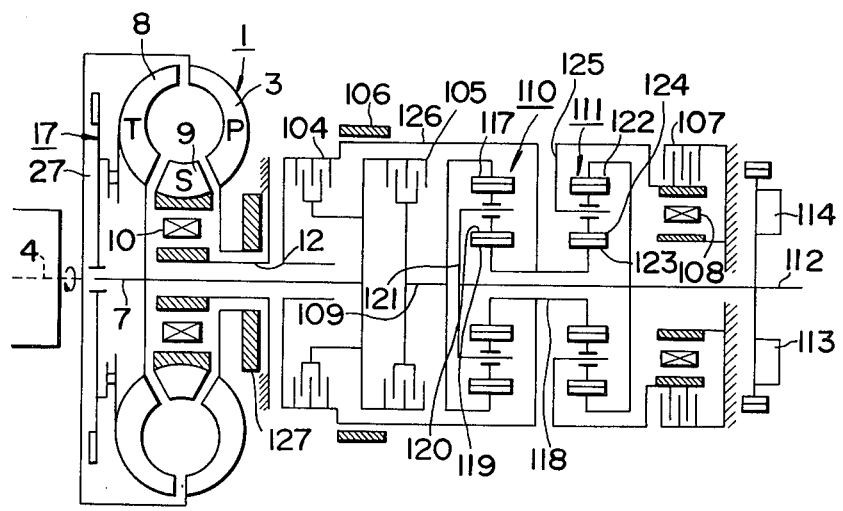
FIG. 1 is a schematic view of a planetary gear portion of an automatic transmission.

Referring to the drawings and particularly to FIG. 1, there are shown a crankshaft 4 driven by a prime mover, viz., an engine, a torque converter 1 having a lock-up mechanism 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111,, an output shaft 112, a first governor valve 113, a second governor valve 114, and an oil pump 13. The torque converter 1 comprises a pump impeller 3, a turbine runner 8, and a stator 9, in which the pump impeller 3 is driven by the crank shaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 via a one-way clutch 10, the one-way clutch allowing the stator 9 to rotate in the same direction as the crankshaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, wherein the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123, respectively, and a planetary pinion carrier 125 for supporting the planetary pinions 124. The front clutch 104 is operative to connect the input shaft 7 to be driven by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, power flow paths to be established when a manual speed selector rod is set in D position (forward drive range) will be explained.

In this case, only the rear clutch 105, a forward clutch, is in engaged condition. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely, and, since the sun gear 123 of the second planetary gear unit 111 which is rotatable with the sun gear 119 rotates reversely, the planetary pinions 124 of the second planetary gear unit 111 rotate forwardly. The one-way brake 108 acts as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby the first forward gear ratio being established.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate at a faster speed than in the case of the first speed although with a certain reduction ratio, thereby the second forward gear ratio being established.

If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby the third forward gear ratio being established. In this case, the input is fed to both the front clutch 104 and rear clutch 105 and the torque increase is not carried out by the planetary gears so that none act as a reaction brake in this state.

Next, the power flow path in the case when the selector rod is set in R position (rearward running) is explained.

In this case, the front clutch 104 and low-and-reverse brake 107 are engaged. The driving power transferred from the engine through the torque converter is transferred from the input shaft 7 through the front clutch 104 and the drum 126 up to the sun gears 119 and 123. In this state, since the rear pinion carrier 125 is anchored by the low and reverse brake 107, the forward reaction of the sun gears 119 and 123 causes the internally toothed gear 122 to rotate in a reversed direction at a reduced speed ratio, thus causing the output shaft 112 that is in rotary unison with this internally toothed gear 122 to provide a reverse drive.

Figure 2A:
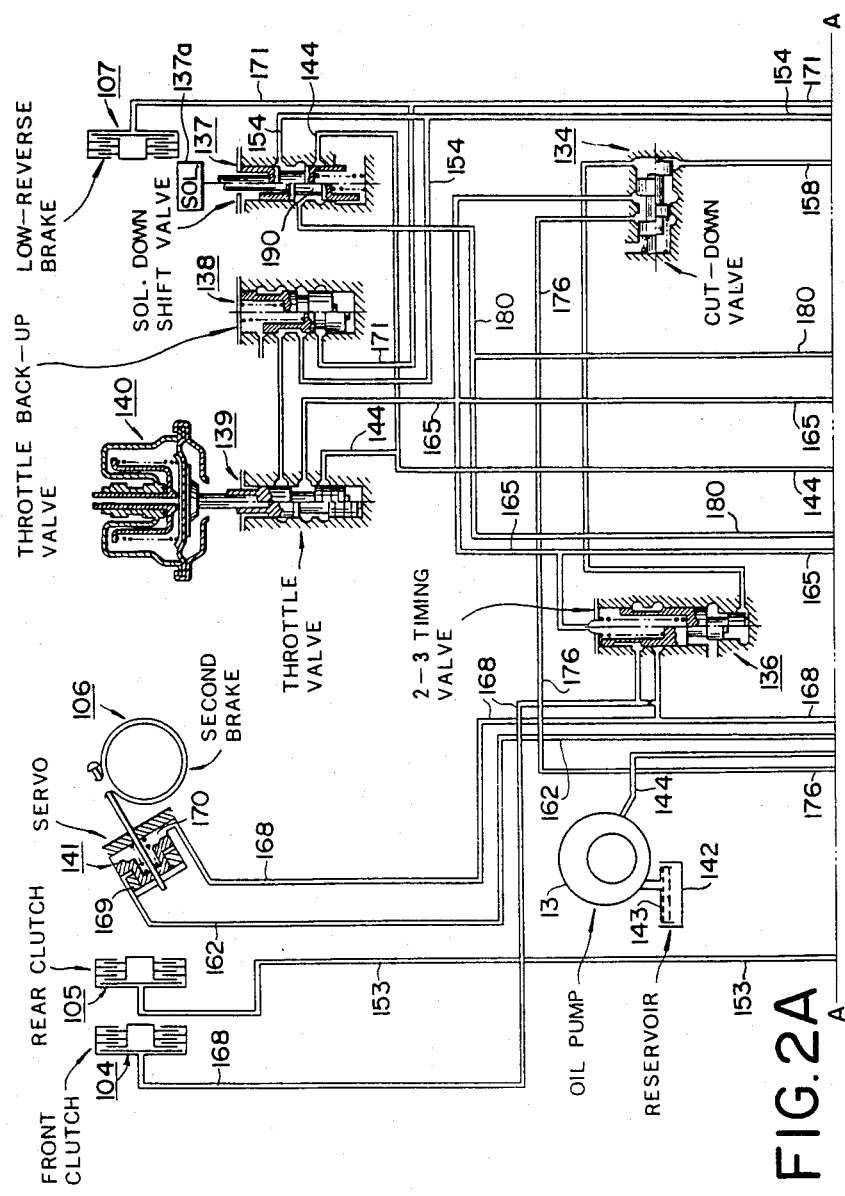
FIGS. 2A and 2B, when combined, provide a schematic view of a hydraulc control portion of the automatic transmission.
Figure 2B:
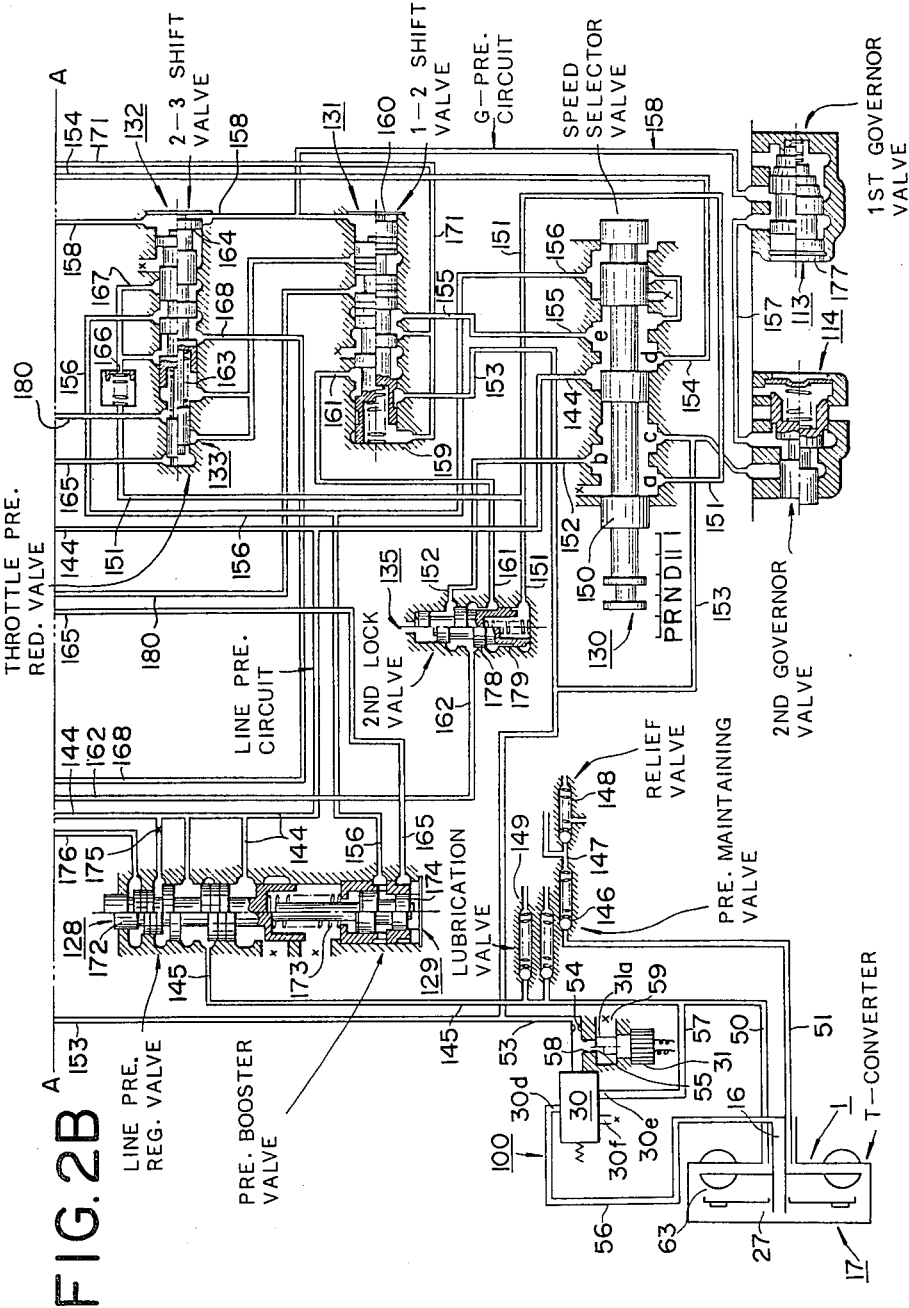

FIGS. 2A and 2B show a hydraulic control system of the above-described change speed transmission, which control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 125, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prime mover to send the oil to a line pressure circuit 144. The oil is regulated by the line pressure regulator valve 128 and the thus regulated oil is transmitted to the torque converter 1 and speed selector valve 130.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 45 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool assumes the N (neutral) position, wherein the line pressure circuit 144 is permitted to communicate with two ports d and e.

The first and second governor valves 113 and 114 are in operative condition to produce a governor pressure while the automobile is moving forwardly. When the speed selector valve 130 assumes either D, II or I position, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shift valve and cut-down valve 134 against the respective springs which urge these valves toward respective lower half positions illustrated in FIGS. 2A and 2B.

The 1-2 shift valve 13 and second lock valve 135 are separately arranged in the oil flow passageway leading from the port c of the speed selector valve 130 through a circuit 153, a circuit 161 and a circuit 162, up to supply side oil pressure chamber 169. A circuit 152 leads from the port b of the speed selector valve 130 to the second lock-up valve 135.

If the speed selector lever 130 is set to the D position, the spool 150 of the speed selector valve 130 assumes a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly by a spring 179 and urged downwardly by the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby the first forward gear ratio condition of the transmission being established.

When, under this condition, the vehicle speed increases up to a certain level the governor pressure in the circuit 158 urges the spool 160 to the 1-2 shift valve 131, which is urged to the right by the spring 159, to move to the left, for effecting an upshift from the first forward speed to the second forward speed, and, as a result, the circuit 153 is permitted to communicate with the circuit 161, thereby allowing the oil pressure to be transmitted through the second lock valve 135 to the supply side oil pressure chamber 169 of the servo 141 through a circuit 162 to apply the second brake 106, thus establishing the second forward gear ratio condition.

When the vehicle speed further increases up to another certain level, the governor pressure in the circuit 158 urges the speed 164 of the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104, thus the third forward gear ratio condition is established.

If the driver depresses the accelerator pedal down to a position causing the full opening of the throttle valve during operation with the speed selector lever in D position, kickdown switch (not shown) is closed or rendered on to energize a downshift solenoid 137a for the solenoid downshift valve 137. This urges the spool 190 of the solenoid downshift valve 137 downwardly against a spring 191 from the locked position as illustrated by the right half in FIG. 2A. This movement of the spool 190 allows the kickdown circuit 180 to communicate with the line pressure circuit 144, thus allowing transmission of line pressure through the circuits 144 and 180 to the 1-2 shift valve 131 and the 2-3 shift valve 132 to act same in opposed relationship with the governor pressure. If, under this condition, the vehicle is operating in the third gear ratio, the spool 164 of the 2-3 shift valve is forced to move against the governor pressure toward the right as viewed in FIG. 2B by the above-mentioned line pressure. This movement of the spool 164 activates the 2-3 shift valve 132 to effect a forced downshift from the third gear ratio to the second gear ratio when the vehicle speed falls in a predetermined range, thus providing a sufficient amount of acceleration force. If the above-mentioned kickdown is carried out during operation in the second gear ratio, since the governor pressure is relatively low, the spool 160 of the 1-2 shift valve 131 is forced to move rightwardly against the governor pressure from the left hand position. This causes a forced downshift from the second gear ratio to the first gear ratio, thus providing a sufficient amount of acceleration force to meet the relatively heavy load.

If the speed selector lever is set to the II position, the spool 150 of the speed selector valve 130 assumes a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear ratio condition being established. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not go through the circuit 151 to the 2-3 shift valve 132, thus neither release of the second brake 106 nor the application of the front clutch 104 will take place, so that an upshift to the third forward gear ratio is prevented. As explained, the second lock valve 135 cooperates with the speed selector valve 130 to lock the transmission in the second forward gear ratio. If the speed selector lever is set to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging to press the spool 160 to the right in cooperation with the spring 159, thereby locking the transmission in the first forward gear ratio once a downshift is made thereto.

Figure 3A:
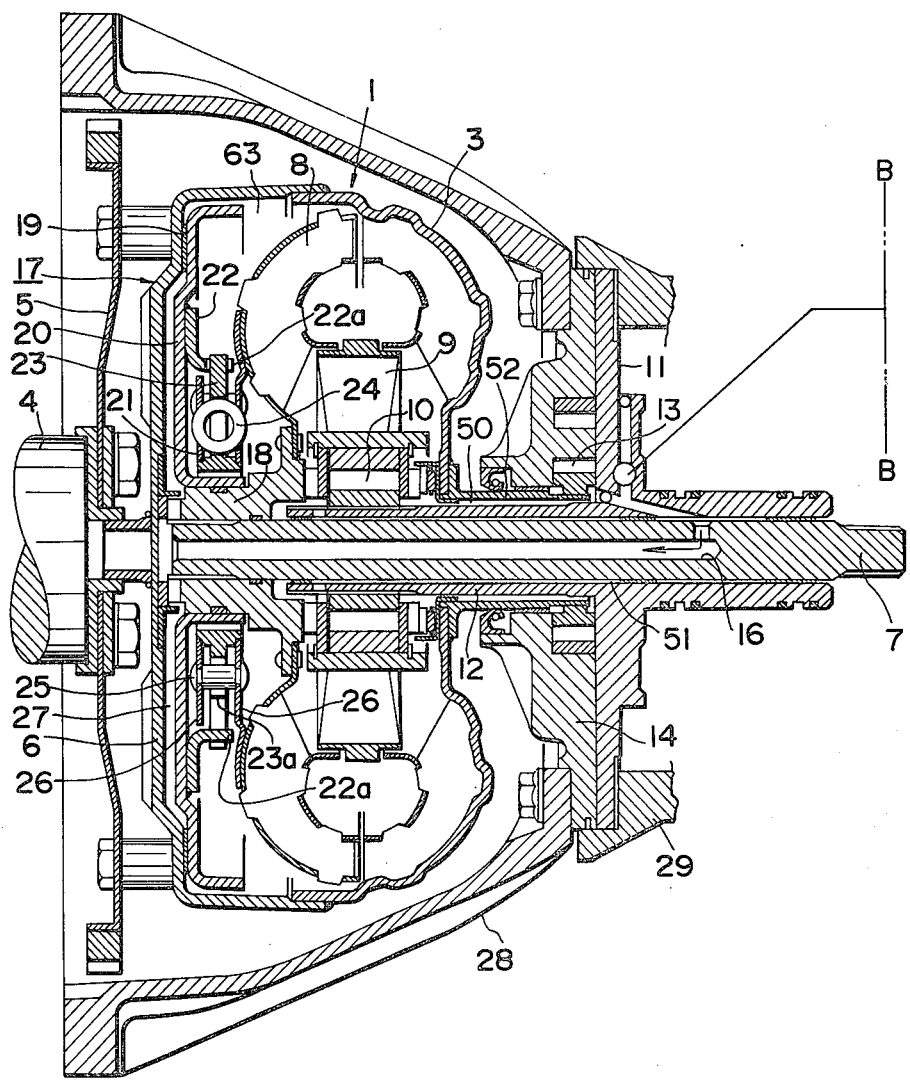
FIGS. 3A and 3B, when combined, provide a sectional view showing the torque converter with a lock-up clutch, lock-up control valve and lock-up solenoid shown in FIG. 2B.

In FIG. 2B, the reference numeral 100 denotes a lock-up control system which comprises a lock-up control valve 30 and a lock-up solenoid 31. The lock-up control valve 30, lock-up solenoid 31 and the torque converter 1 with a lock-up mechanism 17 are specifically explained hereinafter in connection with FIGS. 3A and 3B.

The pump impeller 3 of the torque converter 1 is connected via a torque converter cover 6 with a drive plate 5, which drive plate is connected to the engine crankshaft 4. The turbine runner 8 is splined to an input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which said oil pump 13 is accommodated, which pump is connected to the pump impeller 3 through a hollow shaft 52 driven by the engine. The hollow shaft 52 jackets therein a sleeve 12 to define an annular oil feed passage 50 for said operating oil, and the sleeve 12 allows the input shaft 7 to extend therethrough and cooperate to define therebetween an oil discharge passage 51 for said operating oil. The sleeve 12 is formed integrally with the pump cover 11.

The lock-up mechanism 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby providing an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with the lock-up control system 100.

Figure 3B:
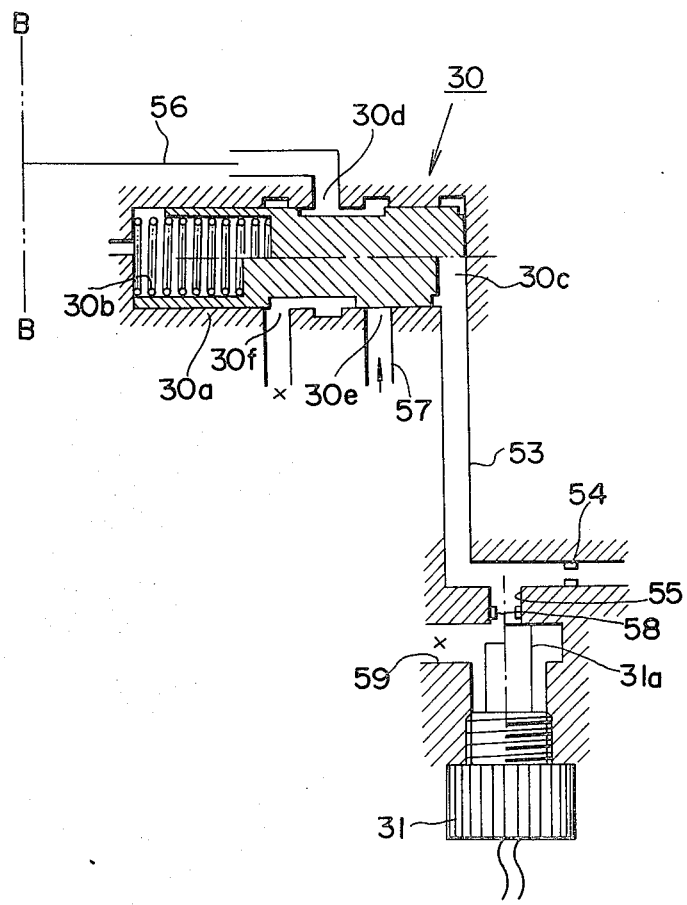

The lock-up control valve 30 is provided with a spool 30a which when taking the position illustrated in the upper half of FIG. 3B, permits a port 30d to communicate with a port 30e and, when taking the position illustrated in the lower half of FIG. 3B, permits the port 30d to communicate with a drain port 30f. The port 30d communicates through a passage 56 with the lock-up passage 16, the port 30e communicates through a branch passage 57 with a torque converter operating oil feed passage 50 as shown in FIG. 2B, and the chamber 30c communicates through a passage 53 with the rear clutch pressure passage 153 as shown in FIG. 2B.

An orifice 54 is provided in the passage 53 at an intermediate portion, and the passage 53 has a branch passage 55 from a location between this orifice and the chamber 30c. The branch passage 55 has therein an orifice 58 and communicates with a drain port 59 and is associated with the lock-up solenoid 31 adapted to open and close the branch passage 55. For this purpose, the lock-up solenoid 31 has a plunger 31a which normally takes an illustrated left half position in FIG. 2B or FIG. 3B, but when the solenoid 31 is energized, projects to assume an illustrated right half position to close the branch passage 55.

When the lock-up solenoid 31 is not energized to allow the plunger 31a to open the branch passage 55, this branch passage communicates with a drain port 59. Then, the rear clutch pressure directed toward the chamber 30c through the passage 53 is extracted from the drain port 59 so that since the spool 30a of the lock-up control valve 30 is conditioned to take an upper half position illustrated in FIG. 3B under the action of the spring 30b, the port 30d is allowed to communicate with the port 30e. Accordingly, the torque converter pressure fed to the passage 57 is fed via the ports 30e and 30d and passages 56 and 16 to the lock-up chamber 27, thus causing the lock-up chamber 27 to have a pressure equal to that of the converter chamber 63. This causes the lock-up clutch piston 20 to move rightwardly from the illustrated position in FIG. 3A so as to disengage its clutch facing 19 from the end wall of the converter cover 6 so that since the direct connection between the pump impeller 3 and the turbine runner 8 is released, the torque converter 1 is allowed to effect normal transmission of driving power in the torque converter state.

When the lock-up solenoid 31 is energized to cause the plunger 31a to close the branch passage 55, the rear clutch pressure is supplied through the passage 53 to the chamber 30c, allowing the lock-up control valve 30 to communicate the port 30d with the drain port 30f because the spool 30a is moved leftwardly from the illustrated upper half position to the iollustrated lower half position in FIG. 3B. This causes the lock-up chamber 27 to communicate through the lock-up passage 16, passage 56 and port 30d with the drain port 30f to attain a non-pressure state. This causes the lock-up clutch piston 20 to be moved leftwardly viewing in FIG. 3A under the effect of the torque converter interior pressure within the converter chamber 63 so that since the clutch facing 19 is pressed against the end wall of the converter cover 6 as illustrated in this Figure, the direct connection between the pump impeller 3 and turbine runner 8 is established to provide a lock-up state.

Figure 4:
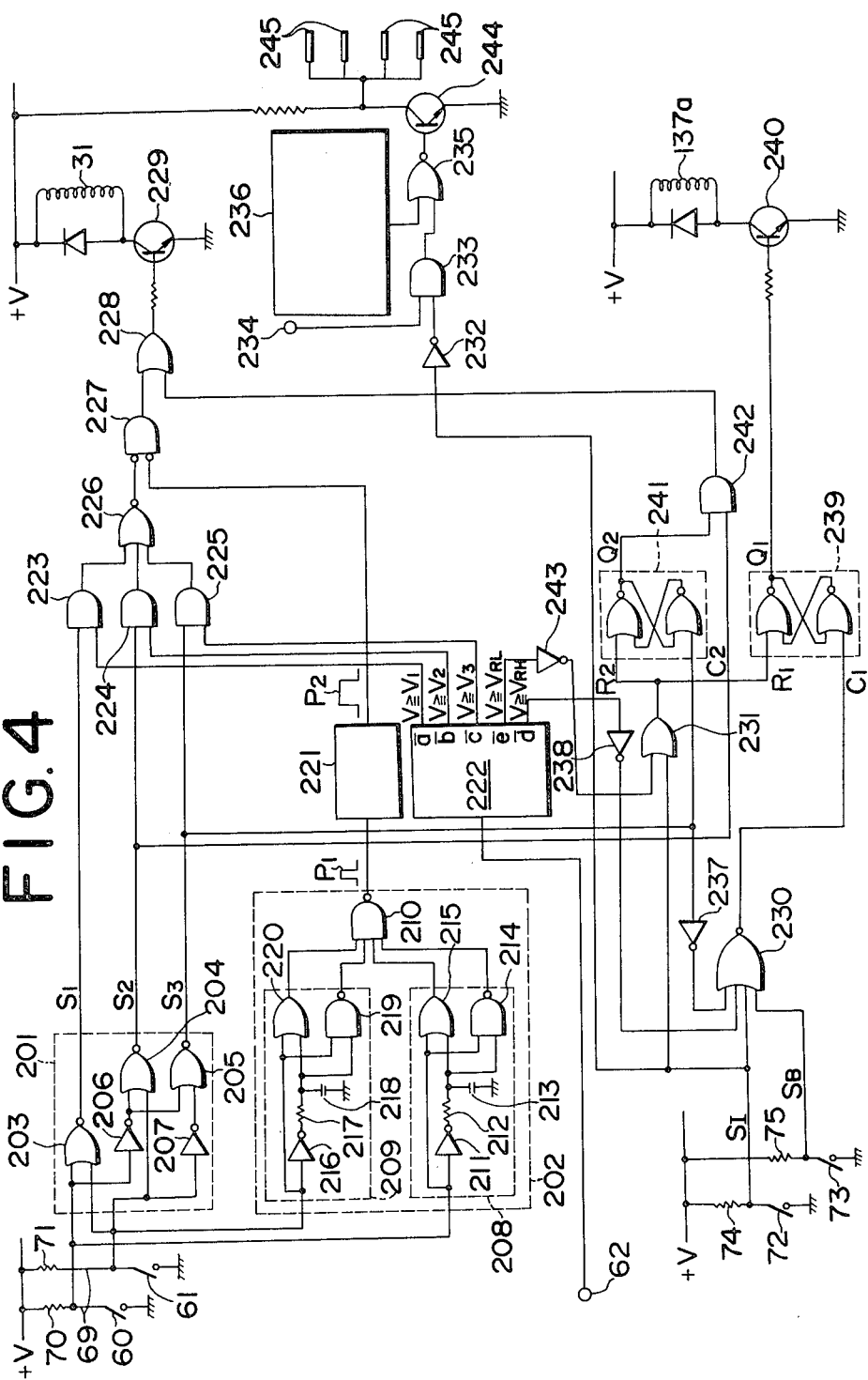
FIG. 4 is a block diagram of a control system according to the present invention.

Referring to FIG. 4, a control system for the automatic transmission according to the present invention is described. In FIG. 4, 60 designates a 1-2 shift switch, 61 designates a 2-3 shift switch, and 62 designates a vehicle speed sensor. As clearly shown in FIG. 5, the 1-2 shift switch 60 and 2-3 shift switch 61 are mounted within the 1-2 shift valve 131 and the 2-3 shift valve 132, respectively, in such a manner that they open or close in response to the positions of the respective spools 160 and 164. For this purpose, stationary contacts 65, 66 are mounted at opposite positions to the valve spools 160, 164, respectively, and these stationary contacts are electrically insulated from the side plate 64 with insulators 67, 68 and cooperate with the valve spools 160, 164 which act as movable contacts. Since the shift valves 131 and 132 are grounded to the vehicle body, it is only necessary to connect respective leads 69 from the stationary contacts 65, 66 to a power supply +V through the respective resistors 70 and 74, thus enabling the stationary contact 65 and the valve spool 160 to form the 1-2 shift switch 60 and enabling the stationary contact 66 and the valve spool 164 to form the 2-3 shift switch 61. When the switch 60 is open a high level signal (a H level signal) appears, whereas, a low level signal (a L level signal) appears when the switch 60 is closed. Likewise, when the switch 61 is open, a H level signal appears, whereas, a L level signal appears when the switch 61 is closed.

Figure 5:
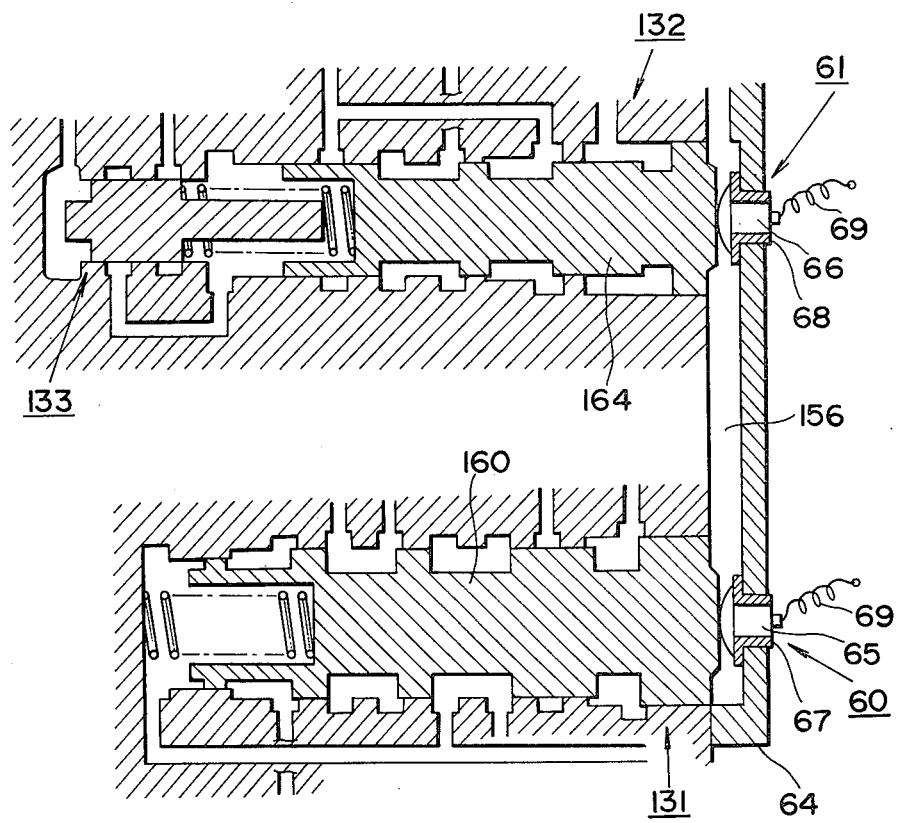
FIG. 5 is a sectional view of the 1-2 shift valve and 2-3 shift valve of the control system shown in FIG. 2B showing the structure of the shift switches shown in FIG. 4.

As will now be understood from the preceding, when the transmission is in the first gear ratio, both of the valve spools 160, 162 are in contact with the stationary contacts 65, 66 as shown in FIG. 5, thus causing the 1-2 shift switch 60 and the 2-3 shift switch 61 to produce low level signals (L). When the transmission is in the second gear ratio, the valve spool 160 only is in a position moved leftwardly to disengage from the stationary contact 65, thus causing the 1-2 shift switch 60 to generate a H level signal (H). When the transmission selects the third gear ratio, the valve spool 164 is also in a position moved leftwardly to disengage from the stationary contact 66, thus causing the 2-3 shift switch 61 to generate a H level signal.

The control circuit shown in FIG. 4 is provided with a gear ratio decision circuit 201 which is fed with a signal from the above mentioned 1-2 shift switch 60 and a signal from the 2-3 shift switch 61. The control circuit is further provided with a gear shifting detector circuit 202 described below.

The gear ratio decision circuit 201 decides the gear ratio selected from the combination of signal levels of the outputs of both switches 60 and 61, and comprises NOR gates 203 to 205 and NOT gates 206 and 207. During operation in the first gear ratio, when the signal levels from the both switches 60 and 61 are L levels, only the output $S_1$ (the first gear ratio signal) of the NOR gate 203 becomes H level, during operation in the second gear ratio when only the signal level of the switch 60 becomes H level, the output $S_2$ (second gear ratio signal) of the NOR gate 204 becomes H level, and during operation in the third gear ratio when the signal level from the switch 61 also becomes H level, only the output $S_3$ (the third gear ratio) from the NOR gate 205 becomes H level.

The gear shifting detector circuit 202 comprises an edge trigger circuit 208 which detects a rise and a fall in the signal from the switch 60, an edge trigger circuit 209 which detects a rise and fall in the signal from the switch 61, and a NAND gate 210. The edge trigger circuit 208 comprises a NOT gate 211, a delay circuit including a resistor 212 and a capacitor 213, a NAND gate 214 for detecting a signal rise, and an OR gate 215 for detecting a signal fall. Similarly the edge trigger circuit 209 comprises a NOT gate 216, a delay circuit including a resistor 217 and a capacitor 218, a NAND gate 219, and OR gate 220. The edge trigger circuits 208 and 209 feed negative polarity pulse signals (the pulse width of which is determined by the delay circuits) to the corresponding input terminals of the NAND gate 210 when the signals from the corresponding shift switches 60 and 61 change from L level to H level or from H level to L level, viz., when a gear shift is made between gear ratios. In this instance, the NAND gate 210 provides a positive polarity trigger pulse signal $P_1$. A timer 221 adjusts the pulse width of this trigger pulse signal to the period of time required for actual gear shifting operation within the automatic transmission and issue a pulse signal P$_2$ having the adjusted pulse width.

Figure 6:
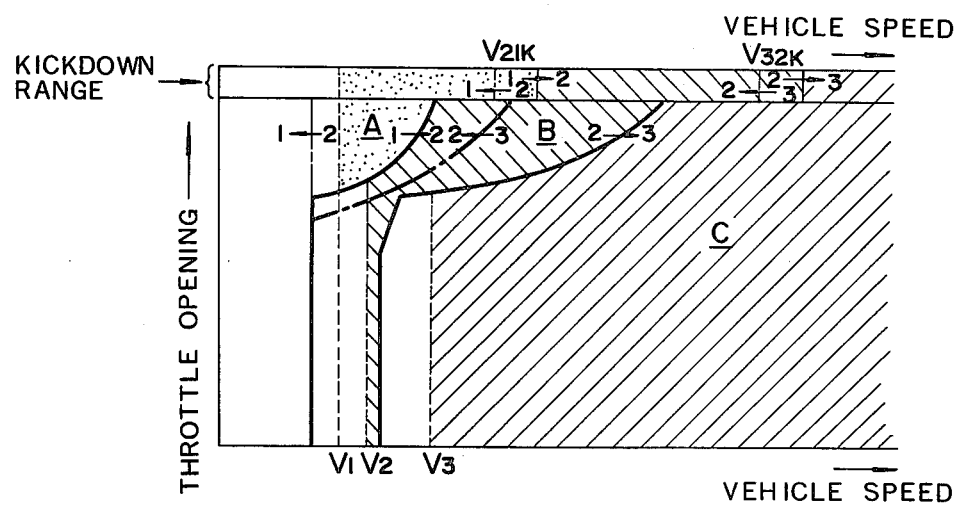
FIG. 6 is a shift pattern diagram showing the lock-up ranges.

The vehicle speed sensor 62 feeds a vehicle speed signal V corresponding to the vehicle speed to a vehicle speed comparator circuit 222, which circuit compares the vehicle speed signal with a lock-up vehicle speed value V$_1$ for a first gear ratio, the lock-up vehicle speed value V$_2$ for a second gear ratio and the lock-up vehicle speed value V$_3$ for the third gear ratio (see FIG. 6), and issues from the corresponding one of gates a, b and c a H level signal to one of input terminals of the corresponding one of the AND gates 223 to 225 when the vehicle speed V is higher than these lock-up signals. The other one of the input terminals of each of the AND gates 223 to 225 is fed with a corresponding one of the first gear signal, second gear signal and third gear signal S$_1$, S$_2$ and S$_3$. Therefore, the corresponding one of the AND gates 223 to 225 issues a H level signal when the vehicle is operating in one of the lock-up ranges for the first gear ratio, for the second gear ratio and for the third gear ratio, viz., when the vehicle is operating within the corresponding one of the ranges A, B and C as illustrated in FIG. 6. When an H level signal is issued by one of the AND gates 223 to 225, this signal causes the NOR gate 226 to issue a L level signal. Although this L level signal is fed to one of input terminals of NOR gate 227 as an actuating signal for the lock-up solenoid 31, the NAND gate 227 will issue a H level signal through an OR gate 228 to a base of a transistor 229, unless the pulse signal P$_2$ is impressed to the other input terminal of the NAND gate 227, viz., unless a gear shifting is effected as will be understood from the preceding description, thus rendering this transistor conductive to energize the lock-up solenoid 31 with the power supply +V.

Accordingly, the lock-up solenoid 31 is energized to cause the torque converter 1 to operate in a lock-up state as previously described when the vehicle operates in one of the lock-up ranges A, B and C as shown in FIG. 6 unless the automatic transmission is subjected to gear shifting.

The pulse signal P$_2$ indicates that the automatic transmission is undergoing a gear shifting operation. This signal is fed to the NAND gate 227 to cause this NAND gate to issue a L level signal, so that even when the vehicle is operating in one of the lock-up ranges, the lock-up solenoid 31 is deenergized during gear shifting. Thus, the torque converter 1 is released from a lock-up state to operate in a converter state, thus preventing the occurrence of a shock inherent to gear shifting. When the vehicle operates outside of the lock-up ranges A, B and C as illustrated in FIG. 6, none of the AND gates 223 to 225 issue a H level signal, thus deenergizing the lock-up solenoid 31 to cause the torque converter 1 to operate in a converter state.

According to the present invention, there are provided in addition to said lock-up control circuit an idle switch 72 and a brake switch 73, and these switches are connected to the power supply +V via respective resistors 74 and 75. The idle switch 72 is closed when an accelerator pedal is released, generating a L level output (an idle signal S$_I$), whereas, when it is closed upon depressing the accelerator pedal, it generates a H level output. The brake switch 73 is closed when the brake pedal is depressed to actuate the brake, generating a L level output (a brake signal S$_B$), whereas, it is open when the brake pedal is released, generating a H level output. The idle signal S$_I$ and brake signal S$_B$ are fed to a NOR gate 230. The idle signal S$_I$ is also fed to an OR gate 231, and to an AND gate 233 through a NOT gate 232. Also fed to the AND gate 233 is a fuel cut-off permission signal (S$_f$) generated by a fuel cut-off permission signal generating circuit 234 which will be described later in connection with FIGS. 8, 9 and 12.

Also fed to the NOR gate 235 is a fuel injection pulse generated by a fuel injection control unit 236, which unit performs a computation based on various kinds of input signals including an engine load, an engine coolant temperature, and an engine speed and issues fuel injection pulses in timed relationship with the engine crank angle. If a L level signal is applied to the other input terminal, the NOR gate 235 issues a H level signal whenever the fuel injection pulse goes to a L level, rendering the transistor 244 conductive in response to the issuance of the H level signal from the NOR gate 235 and opening injectors 245.

When the accelerator pedal is released to cause the vehicle to begin a coasting operation, the idle switch 72 is closed to generate a L level idle signal S$_I$. The L level idle signal S$_I$ is fed not only to NOR gate 230, but also to NOT gate 232. The NOT gate 232 inverts the idle signal S$_I$ and issues a H level signal. The H level signal is fed to one input terminal of the AND gate 233 when the vehicle begins a coasting operation. Fed to the other input terminal of the AND gate 233 is the fuel cut-off permission signal S$_F$ having a H level. The fuel cut-off permission signal S$_F$ represents an operation range in which the engine may be restarted if the supply of fuel is resumed. Thus, the fuel cut-off permission signal S$_F$ appears when the engine operates within the fuel cut-off permission range.

Thus, when the accelerator pedal is released to cause the vehicle to begin a coasting operation and when the engine operates at engine speeds falling in the fuel cut-off permission range, both of the inputs to AND gate 233 go to H level, causing the AND gate 233 to issue a H level fuel cut-off signal Scut. This H level fuel cut-off signal Scut is applied to one of the input terminals of NOR gate 235. Since the NOR gate 235 can not issue a H level signal when at least one of the inputs goes to H level, the NOR gate 235 is closed as long as the H level fuel cut-off signal Scut is being issued by AND gate 233, neglecting the fuel injection pulse from the fuel injection control unit 236. Then, the NOR gate 235 issues a L level signal, leaving the fuel injectors 245 closed to suspend fuel injection, effecting a fuel supply cut-off. The fuel cut-off is released when subsequently the accelerator pedal is depressed to cause the vehicle to begin a power-on operation or when the engine operates at engine speeds outside of the fuel cut-off permission range. Thereupon, one of the inputs of the AND gate 233 goes to L level to cause the AND gate 233 to issue a L level signal, allowing the fuel injection pulse to operate the fuel injection nozzles 245. Thus, the supply of fuel is resumed.

Figure 8:
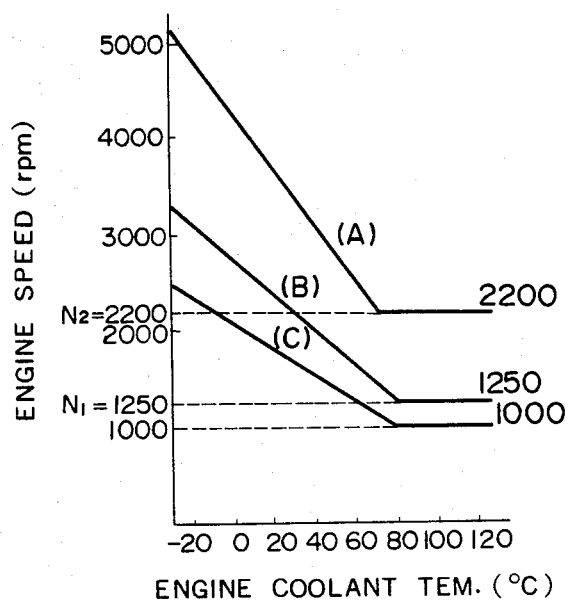
FIG. 8 shows reference vehicle speed vs., engine coolant temperature curves which define a fuel cut permission range.

Referring to FIG. 8, the fuel cut-off permission range is explained. FIG. 8 shows engine speed vs., engine coolant temperature curves (A), (B) and (C). When the accelerator pedal is released to cause the vehicle to begin a coasting operation, the fuel cut-off is initiated if the engine speed is above the curve (B). The fuel cut-off continues as long as the engine speed remains above the curve (C) which is set below the curve (B). As the engine speed decreases during the coasting operation and when the engine speed drops to the curve (C), the fuel cut-off is terminated and the supply of fuel is resumed. After the engine has dropped below the curve (C), the engine speed is increased again as the vehicle decends a long slope and when the engine speed increases above the curve (A), the fuel cut-off is resumed.

Figure 9:
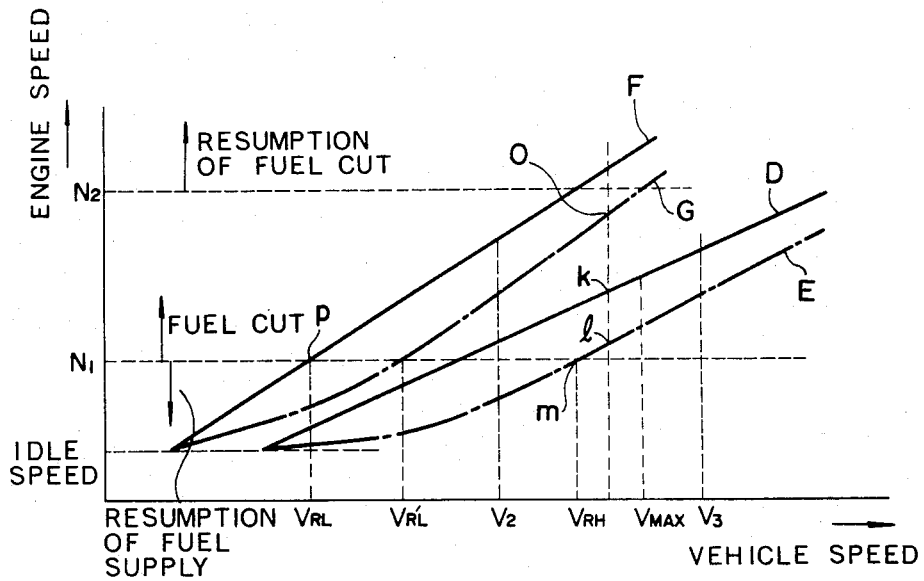
FIG. 9 shows engine speed vs., vehicle speed curves for various gear ratios with lock-up mechanism and for the same gear ratios without such lock-up mechanism when the vehicle begins a coasting operation.

FIG. 9 shows how the engine speed decreases as the vehicle speed decreases when the automotive vehicle begins a coasting operation. Curve D shows the variation of the engine speed as the vehicle speed decreases when the transmission selects the third gear ratio with its torque converter operating in a lock-up state. Curve E shows the variation of the engine speed as the vehicle speed decreases when the transmission selects the third gear ratio with its torque converter operating in a converter state. Curve F shows the variation in the engine speed as the vehicle speed decreases when the transmission selects the second gear ratio with its torque converter in a lock-up state. Curve G shows the variation in the engine speed as the vehicle speed decreases when the transmission selects the second gear ratio with its torque converter in a converter state.

Refering back to FIG. 4, the NOR gate 230 is fed not only with the idle signal $S_I$ and brake signal $S_B$, but also with a third gear ratio signal $S_3$ via NOT gate 237 and with a signal representing a comparison result from the gate $\bar{d}$ the vehicle speed comparator circuit 222 via NOT gate 238. The vehicle speed comparator circuit 222 compares vehicle speed signal V with a predetermined vehicle speed $V_{RH}$ (see FIG. 9) at which the engine speed decreases to the engine speed $N_1$ (see FIGS. 8 and 9) when the vehicle is coasting with the automatic transmission in the third gear ratio.

The comparator 222 generates a H level signal from the gate $\bar{d}$ when $V \geq V_{RH}$. All of the inputs to the NOR gate 230 go to L level as long as the third gear is selected and the engine speed is higher than $V_{RH}$ upon depressing the brake pedal after the accelerator pedal has been released to cause the vehicle to begin a coasting operation. If these conditions are satisfied, the NOR gate 230 issues and feeds a H level signal to a set terminal $C_1$ of a first flip-flop 239. This causes the flip-flop 239 to issue a H level signal from an output terminal $Q_1$, rendering the transistor 240 conductive to energize the downshift solenoid 137a (see FIG. 2A), changing the automatic transmission from the third gear ratio to the second gear ratio (forced downshift).

The H level third gear ratio signal $S_3$ which appears before this downshift is fed also to a set terminal $C_2$ of a second flip-flop 241. This causes the flip-flop 241 to issue a H level signal from its output terminal $Q_2$ to one of input terminals of an AND gate 242. The flip-flop 241 keeps on issuing the H level signal even after the H level third gear ratio signal $S_3$ has disappeared as a result of the above-mentioned downshift. The AND gate 242 issues a H level signal when, as a result of the above-mentioned downshift, a H level second gear ratio signal $S_2$ is issued and fed to the other input terminal of the AND gate 242. This high level signal issued from the AND gate 242 is fed to the OR gate 228 to energize the lock-up solenoid 31, thus forcibly causing the torque converter to operate in a lock-up state (forced lock-up) irrespective of the level of the signal impressed to the other input terminal of the NOR gate 228.

It will be noted that the forced lock-up takes place after the forced downshift because the forced lock-up is initiated by the appearance of the H level second gear ratio signal $S_2$.

If at least one of the following conditions is satisfied, a H level signal is applied to at least one of the inputs to the OR gate 231 to cause the OR gate 231 to issue and feed a H level signal to the reset terminals $R_1$ and $R_2$ of both flip-flops 239 and 241 to reset them. One of the conditions is that the accelerator pedal is depressed for acceleration to cause the H level idle signal $S_1$ to disappear, the other condition being that the vehicle speed comparator circuit 222 issues a L level signal from gate $\bar{e}$, which signal is inverted into a H level after being inverted by the NOT gate 243, when the vehicle speed signal V is lower than a reference vehicle speed value $V_{RL}$ (see FIG. 9) at which the engine speed is $N_1$. This causes the flip-flops 239 and 241 to issue L level signals from the output terminals $Q_1$ and $Q_2$, thus releasing the forced downshift and lock-up, thus allowing the automatic transmission to resume its ordinary gear shifting control and lock-up control. Under this running condition, since the accelerator pedal is depressed or the engine speed drops below the predetermined value $N_1$, the fuel cut-off is released.

It will now be understood that, upon depressing the brake pedal as long as the vehicle speed is higher than $V_{RH}$ and the automatic transmission selects the highest gear ratio after the accelerator pedal has been released to cause the vehicle to begin a coasting operation, the automatic transmission is forcibly changed from the highest gear ratio (the third gear ratio) down to the next lower gear ratio (second gear ratio) and subsequently the torque converter is forcibly locked up.

This forced lock-up which is effected to cause the fuel cut-off time period to be extended, although effective, is not necessary in all cases, because, for example, in the case of an automatic transmission without such a lock-up mechanism 17 (see FIGS. 1 and 3A), a forced downshift only provides a sufficent increase in engine speed from the level of the curve E to the level of the curve G as shown in FIG. 9, thus elongating the time period of the fuel cut-off to the vehicle speed value $V_{RL}$ (see FIG. 9). In this case, the flip-flop 241 and its associated parts are unnecessary. Therefore, with automatic transmissions having no lock-up mechanism 17, the predetermined vehicle speed value $V_{RL}$ is replaced by a new predetermined vehicle speed value $V_{RL}'$.

Figure 7:
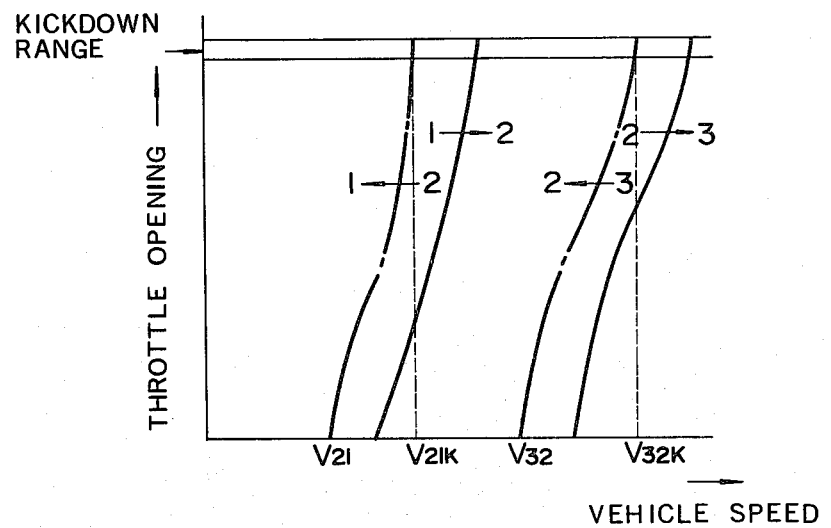
FIG. 7 is a shift pattern diagram when the downshift solenoid is energized to actuate the kickdown valve shown in FIG. 2A.

As described above, when the downshift solenoid 137a is energized upon making a forced downshift, the automatic transmission undergoes its shifting according to a schedule shown in FIG. 7. During a coasting operation, as the throttle opening degree is zero, the forced downshift from the third gear ratio to the second gear ratio and the downshift from the second gear ratio to the first gear ratio are subsequently effected between vehicle speed values $V_{32}$ and $V_{21}$ shown in FIG. 7. Thus, the predetermined vehicle speed values $V_{RL}$ ($V_{RL}'$) and $V_{RH}$ must be set between the vehicle speed values $V_{32}$ and $V_{21}$.

Although in the preceding embodiments the conditions when the forced downshift is to be effected includes a condition that the vehicle speed V is higher than the predetermined vehicle speed $V_{RH}$, this condition may be replaced with a condition that the engine speed value is higher than the engine speed value $N_1$ with substantially the same result.

Figure 10:
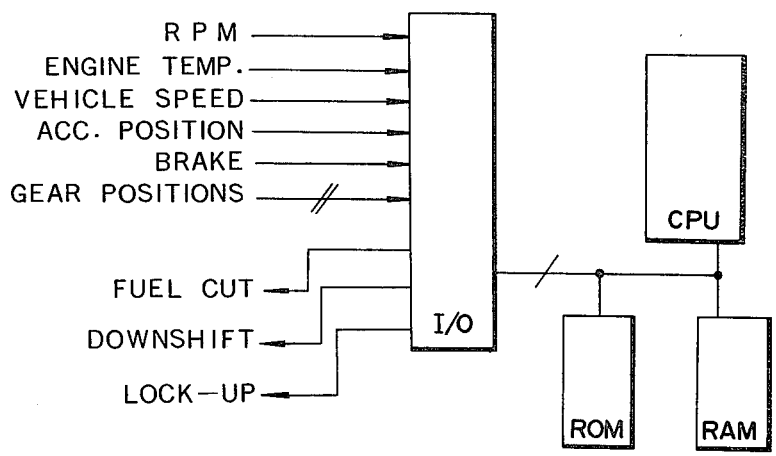
FIG. 10 is a block diagram of a microprocessor.

The control operation employed by the control system shown in FIG. 4 may be carried out by a system using microprocessor as shown in FIG. 10.

FIG. 10 shows the microprocessor which includes usual components, such as, RAM, ROM, CPU, I/O interface etc., as well known in the art.

Figure 11:
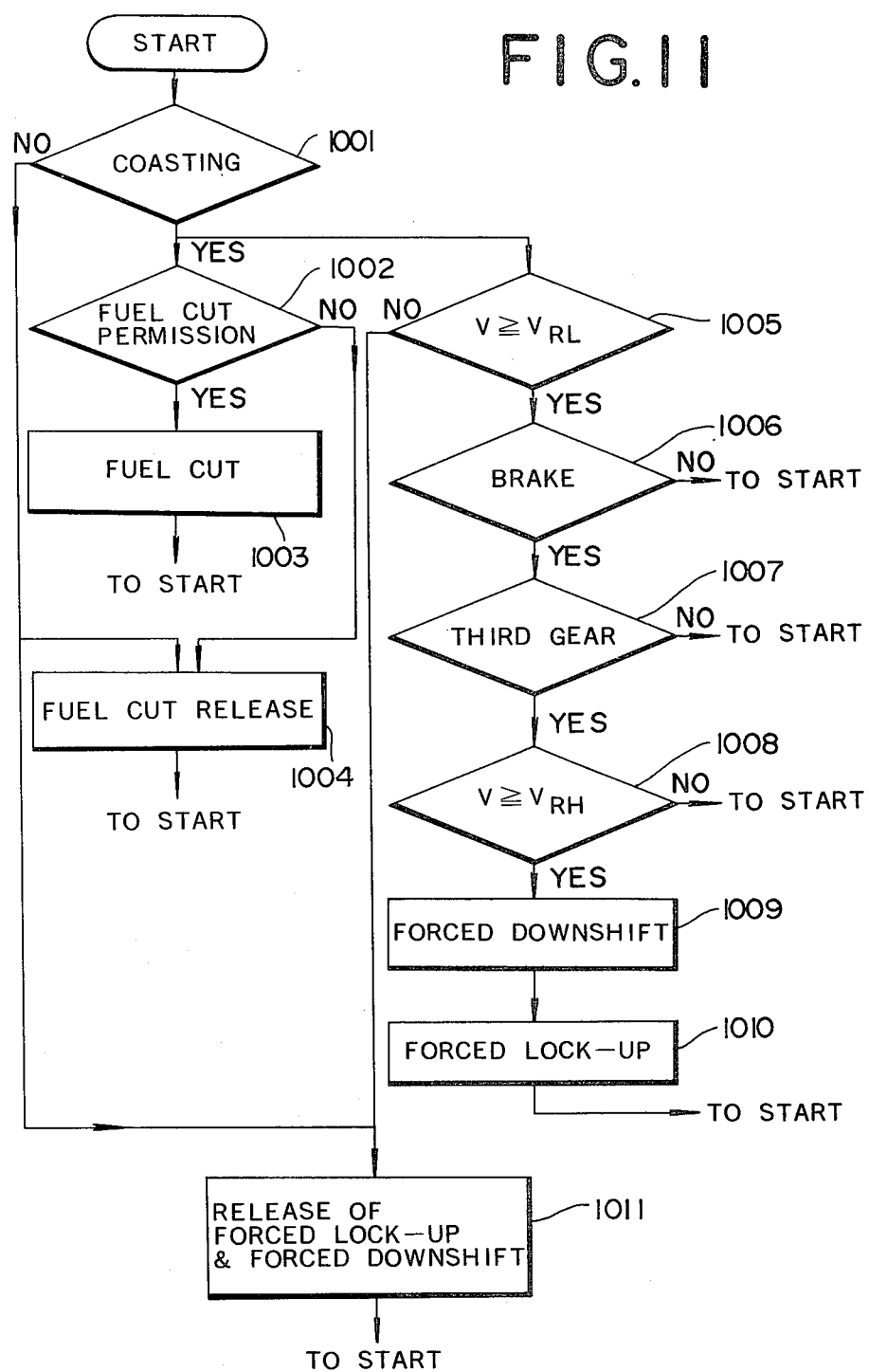
FIG. 11 is a flow diagram implementing the embodiment shown in FIG. 4.

FIG. 11 is a flow diagram implementing the embodiment shown in FIG. 4.

Referring to FIG. 11, a decision is made in a step 1001 whether or not the vehicle is coasting. If the answer of the step 1001 is YES, a decision is made in a step 1002 whether or not the engine is operating in the fuel cut-off permission range by comparing the actual engine speed with the reference engine speed value. If the answer of the decision step 1002 is YES, a fuel cut-off command signal is generated by a step 1003. If the answer of the decision step 1001 is NO, the fuel cut-off is released in a step 1004. If the answer of the step 1002 is NO, the fuel cut-off is released.

If the answer of the decision step 1001 is YES, the microprocessor goes to a decision step 1005 where a decision is made whether the vehicle speed is higher than $V_{RL}$ (see FIG. 9). If the answer of the step 1005 is YES, it goes to a decision step 1006 where a decision is made whether or not the brake pedal is depressed. If the answer of the step 1006 is YES, it goes to a step 1007 where a decision is made whether or not the transmission is operating in the third gear ratio. If the answer of the step 1007 is YES, it goes to a decision step 1008 where a decision is made whether or not the vehicle speed is higher than $V_{RH}$. If the answer of this step 1008 is YES, a forced downshift command signal is generated in a step 1009 and after the forced downshift from the third gear ratio to the second gear ratio has been carried out, a forced lock-up command signal is generated in a step 1010.

If the answer of the decision step 1001 is NO, the forced downshift and forced lock-up states are released in a step 1011. If the answer of the decision step 1005 is NO, the forced downshift and lock-up states are released in the step 1011.

Referring to FIGS. 12 to 15, other embodiments are described hereinafter.

Figure 12:
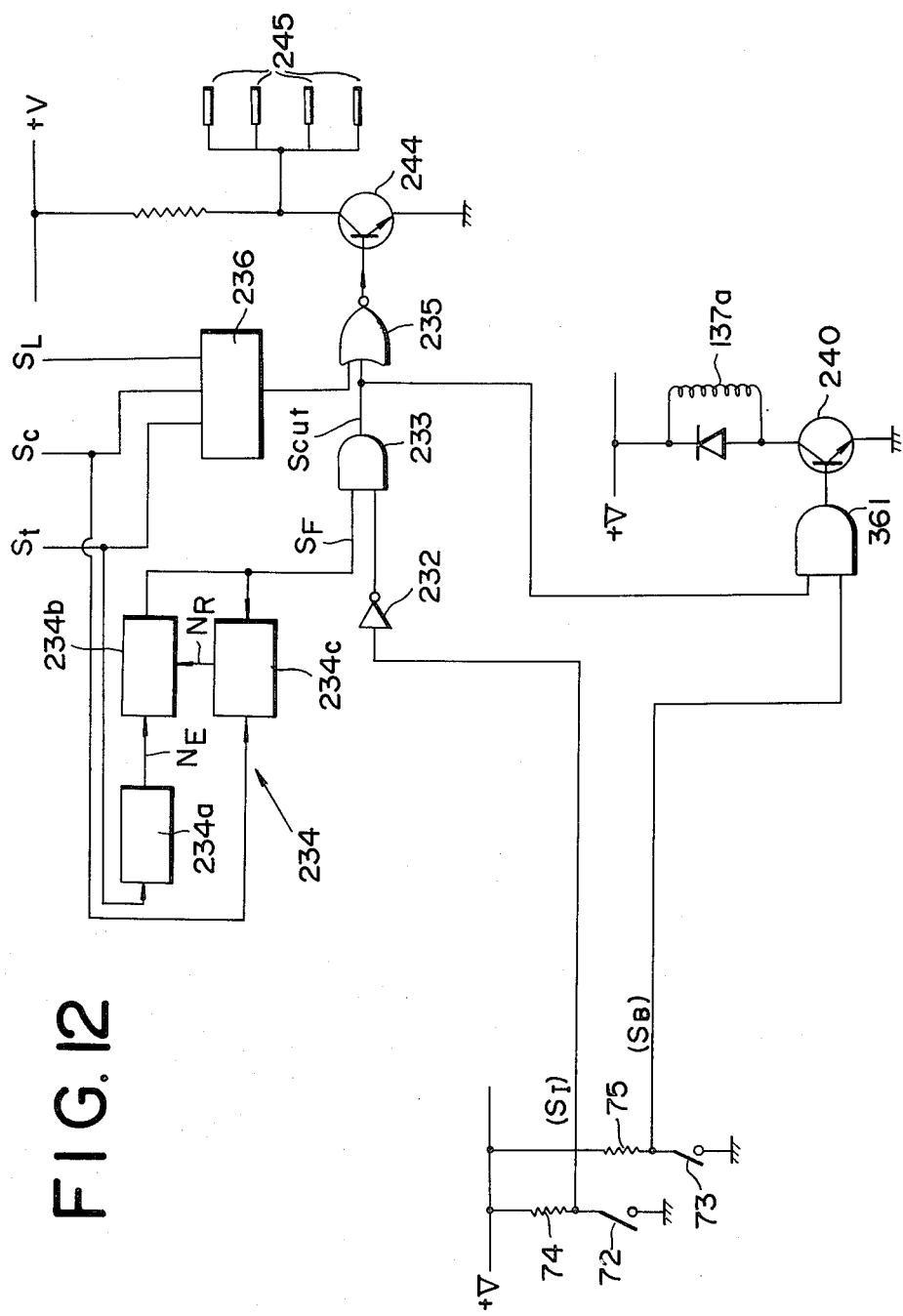
FIG. 12 is a block diagram of another embodiment.

FIG. 12 shows another embodiment of a control system according to the present invention. This embodiment is different from the embodiment shown in FIG. 4 in that it is applied to an automatic transmission which is not provided with a lock-up mechanism for its torque converter and features that a downshift command signal is generated by an AND gate 361 when a H level brake signal $S_B$ is issued under a condition that a fuel cut-off signal Scut is issued by an AND gate 233.

The control system comprises a fuel injection control unit 236 which is well known in the art. The fuel injection control unit 236 performs a computation based on various input signals $S_t$, $S_c$ and $S_L$ representing fuel injection timing, engine coolant temperature and engine load, respectively, so as to determine the pulse width of the fuel injection pulse. It also comprises a fuel cut-off permission signal generating circuit 234. The circuit 234 comprises a frequency-voltage converter (F/V converter) 234a, a comparator 234b, a reference voltage generating circuit 234c. The F/V converter 234a converts the frequency (corresponding to the engine speed) of the fuel injection timing signal $S_t$ into an electric voltage signal to feed the electric voltage signal (engine speed signal) $N_E$ to the comparator 234b. The reference electric voltage generating circuit 234c is fed with the engine coolant temperature signal $S_c$ and reads an engine speed value among values plotted on curve (B) shown in FIG. 8 in response to engine coolant temperature (signal $S_c$), and it generates a reference electric voltage $N_R$ representing the read out engine speed. Depending upon the output of the comparator 234b, the reference voltage generating circuit 234c generates a reference voltage representing a value on curve (A) or curve (B) (see FIG. 8). The comparator generates a H level fuel cut-off permission signal $S_F$ when the engine speed is higher than the curve (B) (see FIG. 8). The fuel cut permission signal $S_F$ is fed to the reference vehicle speed generating circuit 234c. When the reference voltage generating circuit 234c receives this H level fuel cut permission signal $S_F$, it generates a reference voltage based upon the curve (B) (see FIG. 8). When the engine speed signal $N_E$ decreases below the curve (B), the comparator 234b switches its output to generate a L level signal, and when it receives this L level signal, the reference electric voltage generator 234c generates a reference voltage based upon the curve (A). Therefore, as a result of comparison between the reference voltage $N_R$ and the engine speed signal $N_E$, the comparator 234b keeps on generating a H level fuel cut-off permission signal $S_F$ until the engine speed drops beyond the curve B (see FIG. 8), whereas, it starts to generate a L level output signal once the engine speed has dropped below the curve (B) and keeps on generating the L level output signal until the engine speed rises beyond the curve (A) (see FIG. 8).

The output signal $S_F$ of the comparator 234b is fed to an AND gate 233 which is fed also with a L level idle signal $S_I$ through a NOT gate 232. The AND gate 233 issues a H level fuel cut-off signal Scut when a L level idle signal $S_I$ is issued under a condition that a H level fuel cut-off permission signal $S_F$ is issued.

According to this embodiment, an AND gate 361 is fed with the above-mentioned fuel cut-off signal Scut and also with a brake signal $S_B$.

In this embodiment, if, after the accelerator pedal has been released to cause the vehicle to begin a coasting operation, the brake is depressed when the engine operates within the fuel cut-off permission range (within a range when the fuel cut-off permission signal $S_F$ exits), both of the input signals to the AND gate 361 go to H levels, respectively, thereby energizing the downshift solenoid 137a. Energization of the downshift solenoid 137a causes a downshift in the transmission in the same manner as the kickdown, causing an increase in the reduction ratio, resulting in an increase in the engine revolution speed.

Since the transmission downshifts to the next lower gear ratio when the brake is depressed during a coasting operation with the fuel cut-off being effected, effective engine braking is provided.

Since AND gate 361 will not generate a H level signal to energize the downshift solenoid 137a unless the fuel cut-off signal Scut is generated, the unintentional downshift within the automatic transmission is prevented. Since the downshift in the automatic transmission is not effected if the fuel cut-off signal Scut exists until the brake pedal is depressed to issue the H level brake signal $S_B$, the engine brake is not effected when it is not necessary.

Figure 13:
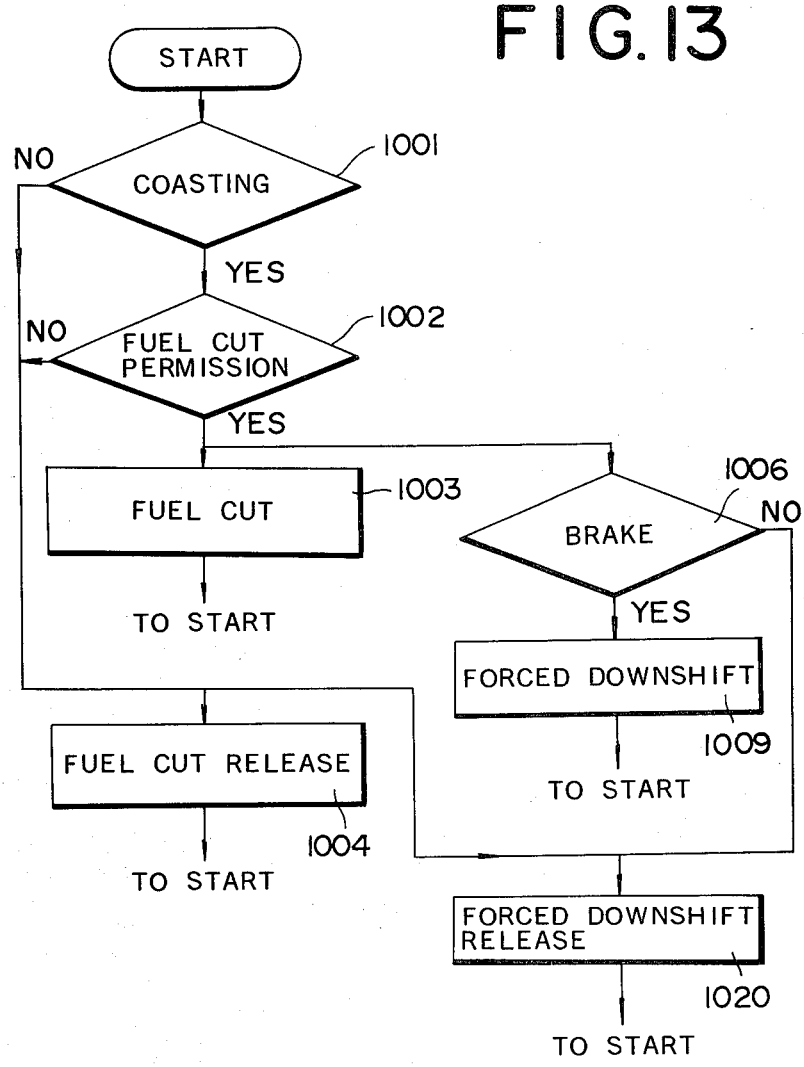
FIG. 13 is a flow diagram implementing the embodiment shown in FIG. 12.

Referring to FIG. 13, there is shown a flow diagram implementing the embodiment shown in FIG. 12.

This flow diagram is substantially similar to that shown in FIG. 11 in steps from a coasting decision step 1001 down to a fuel cut-off command signal generating step 1003, but is different in the following respects:

If the answer of a fuel cut-off permission decision step 1002 is YES, a decision is made in a step 1006 whether or not the brake pedal is depressed. If the answer of this step 1006 is YES, a forced downshift command signal is generated in a step 1009. If the answer is NO, the forced downshift state is released in a step 1020. The forced downshift state is released also when the answer of the fuel cut-off permission decision step 1002 is NO.

Figure 14:
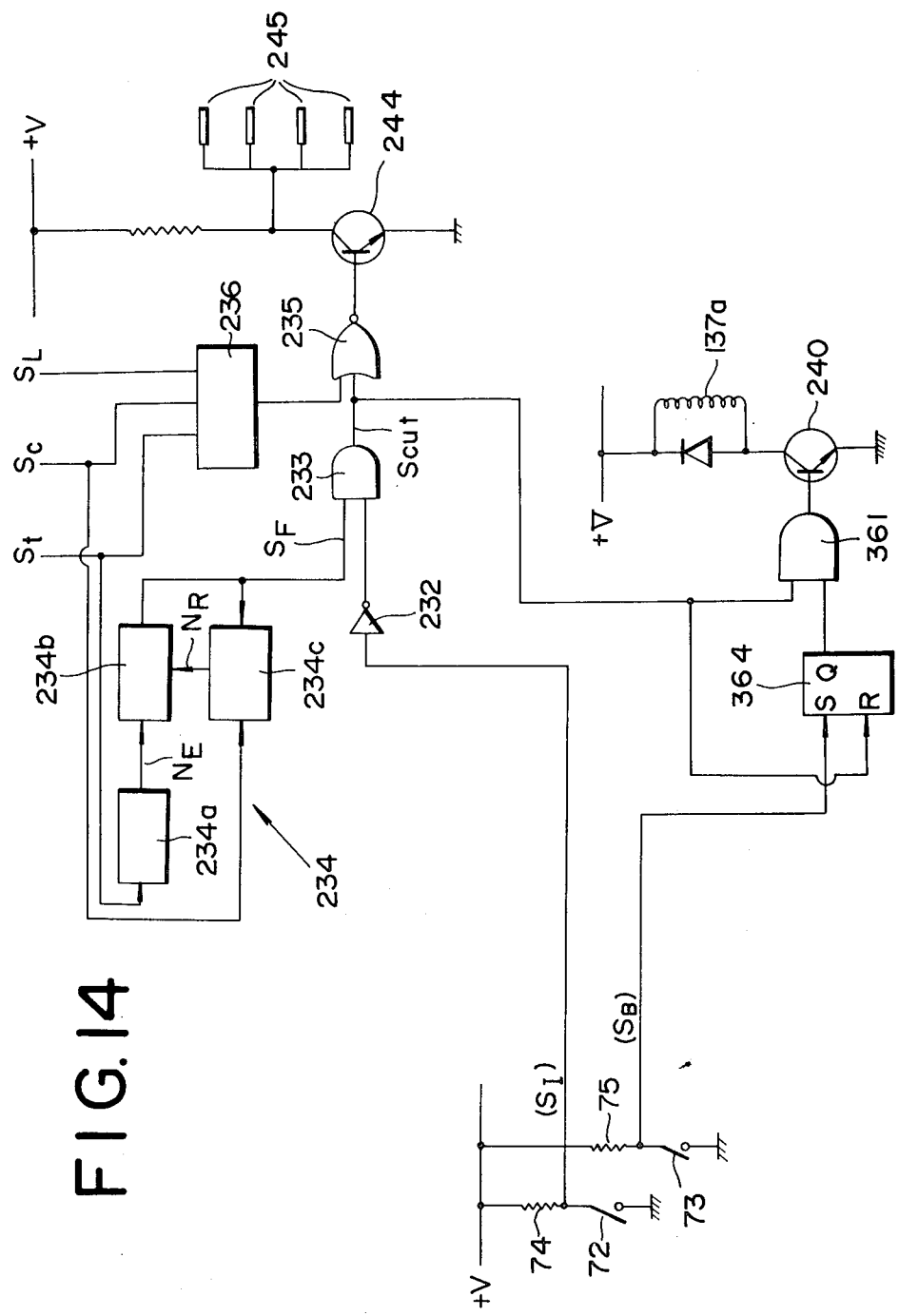
FIG. 14 is a block diagram of a modified embodiment of FIG. 12 embodiment.

FIG. 14 shows another embodiment according to the present invention, wherein, instead of feeding a brake signal $S_B$ directly to an AND gate 361, the signal is memorized in a flip-flop 364 and its output is fed to the AND gate 361. For this purpose, the brake signal $S_B$ is fed to a set terminal S of the flip-flop 364, whereas, the fuel cut-off signal Scut is fed to a reset terminal R of the flip-flop 364. The flip-flop 364 generates a H level signal from an output terminal Q in response to the brake signal $S_B$, viz., when the brake pedal is depressed, and keeps on issuing this output level as long as the H level fuel cut-off signal Scut exits, and when the H level fuel cut-off signal Scut terminates, the output signal level from the terminal Q changes to a L level.

Thus, according to this embodiment, once the brake pedal is depressed while the H level fuel cut-off signal is present, the AND gate 361 keeps on generating a forced downshift command signal as long as the fuel cut-off signal Scut is present. This causes further increase in the time period of the operation of the fuel cut-off as compared to the preceding embodiment shown in FIG. 12 because the cycle of downshift and upshift in the automatic transmission in response to depression of the brake pedal and the subsequent release of the brake pedal is prevented.

Figure 15:
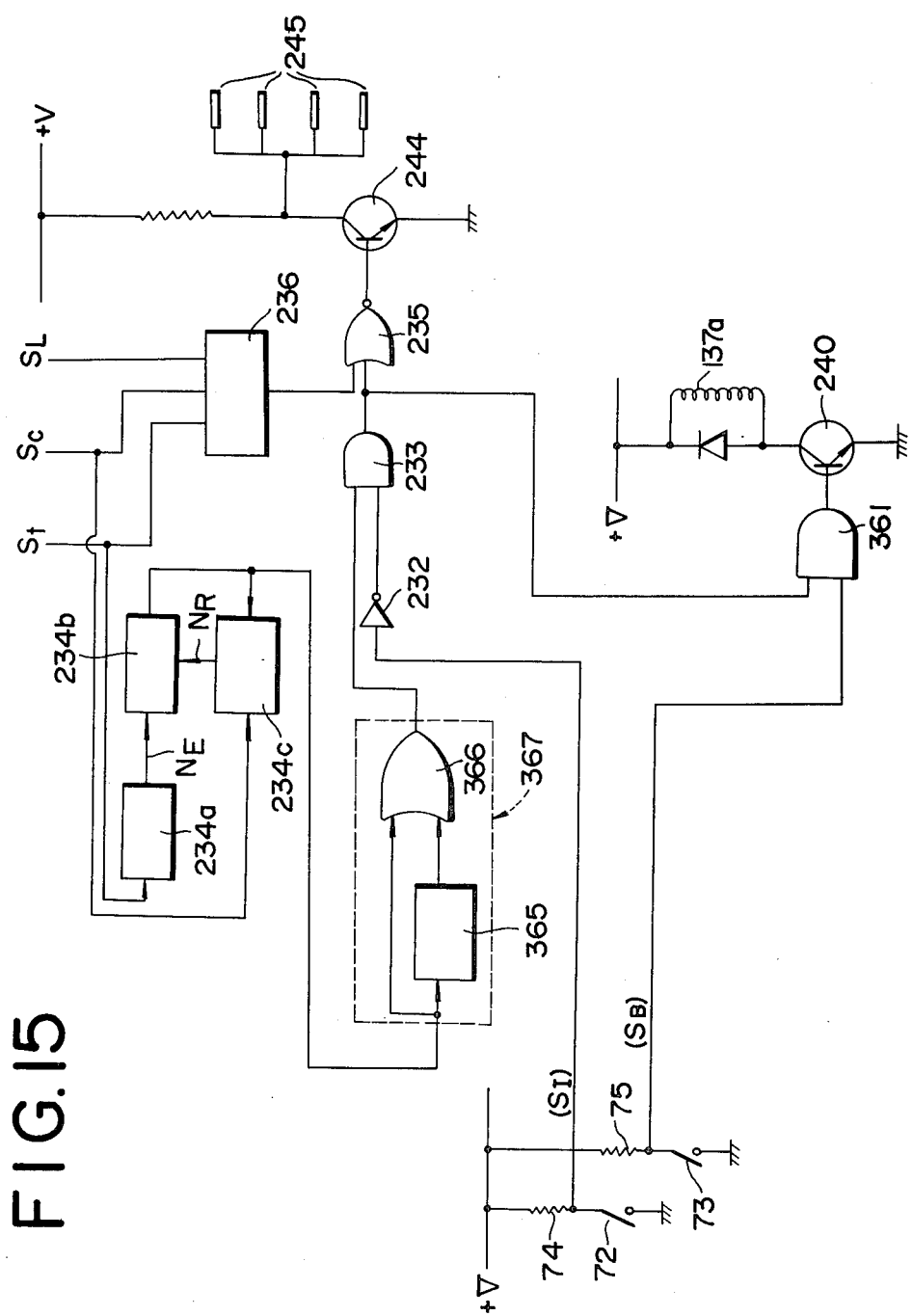
FIG. 15 is a block diagram of a modified embodiment of FIG. 12 embodiment.

FIG. 15 shows still another embodiment which differs from the embodiment shown in FIG. 12 in that, instead of feeding a fuel cut-off permission signal $S_F$ generated by a comparator 234b directly to an AND gate 233, the fuel cut-off permission signal $S_F$ is fed through a holding circuit 367 including a delay circuit 365 and an OR gate 366.

According to this embodiment, even if the H level fuel cut-off permission signal $S_F$ terminates or changes to a L level before the actual forced downshift has been completed, the holding circuit 367 maintains a H level signal for a predetermined period of time independent of the H level fuel cut-off permission signal $S_F$, thus allowing the OR gate 366 to continue to generate a H level signal, thus maintaining the downshift command signal until the automatic transmission completes the forced downshift.

Figure 16:
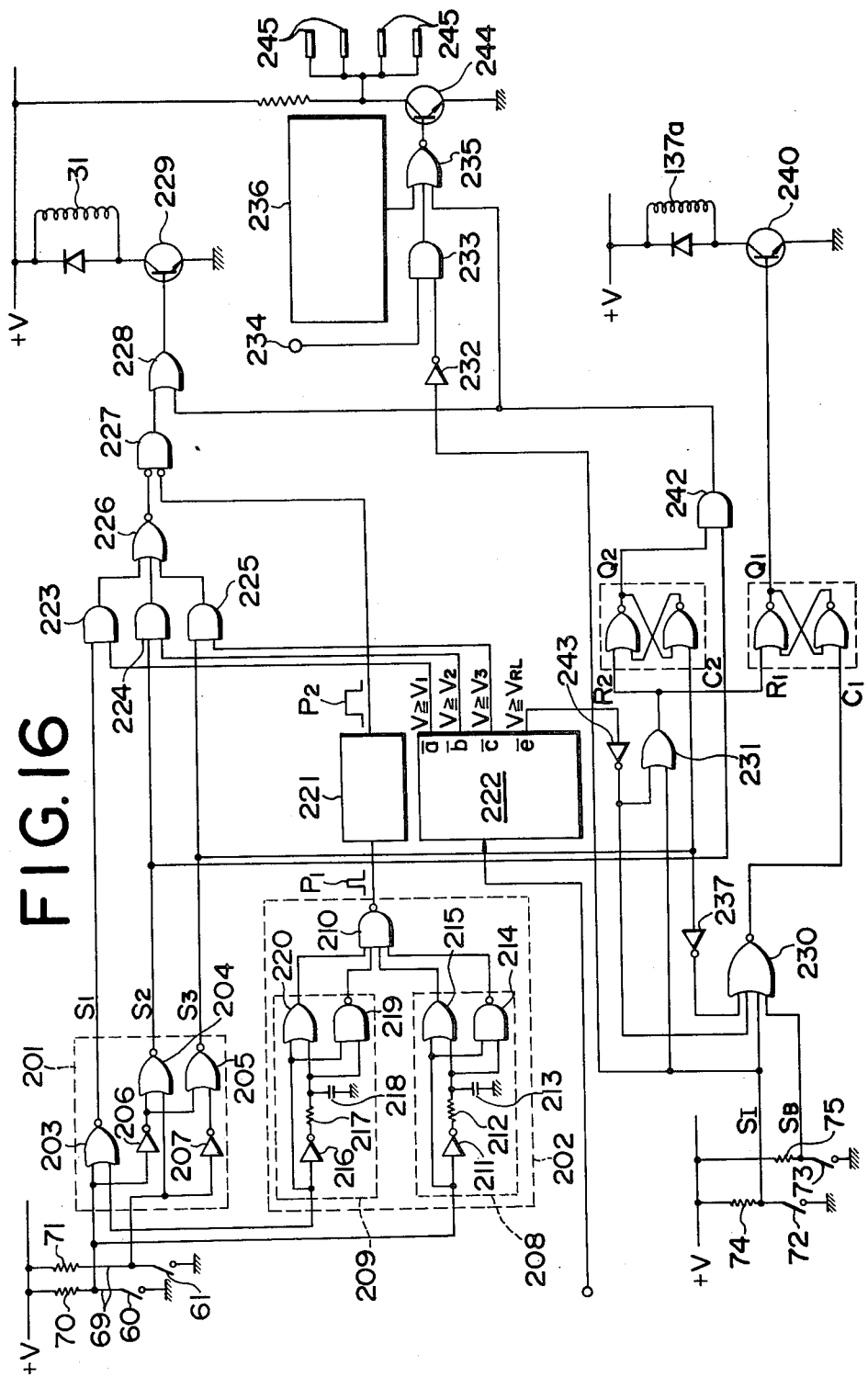
FIG. 16 is a block diagram of a modified embodiment of FIG. 4 embodiment.

Referring to FIG. 16, a still another embodiment of a control system according to the present invention is illustrated. This embodiment is substantially the same as the previously described embodiment shown in FIG. 4 except the following two respects.

Instead of feeding a comparison result $V \geq V_{RH}$ to a NOR gate 230, a comparison result $V \geq V_{RL}$ is fed to the NOR gate 230.

A forced lock-up command signal which is to be generated after the completion of the forced downshift is fed to a NOR gate 235 for prohibiting the release of fuel cut-off as long as the transmission is in the forced lock-up state.

Figure 17:
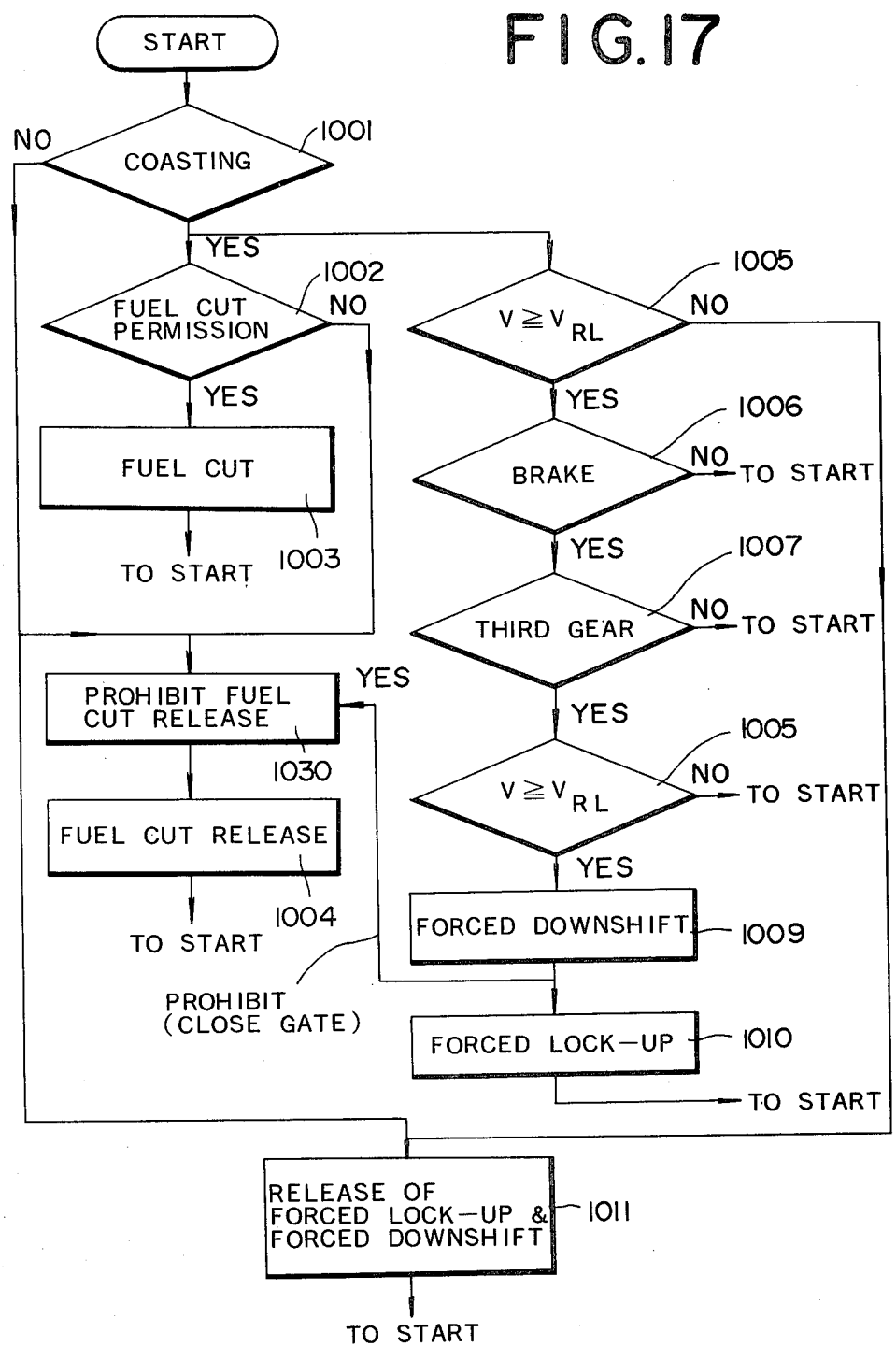
FIG. 17 is a flow diagram implementing the embodiment shown in FIG. 16.

FIG. 17 is a flow diagram implementing the embodiment shown in FIG. 16.

This flow diagram is substantially similar to that shown in FIG. 11, but is different in that a decision step 1005 has replaced a decision step 1008 shown in FIG. 11. It is also different in that a prohibit fuel cut-off step or gate 1030 is provided to prevent the release of the fuel cut-off as long as the forced lock-up command signal is present.

Figure 18:
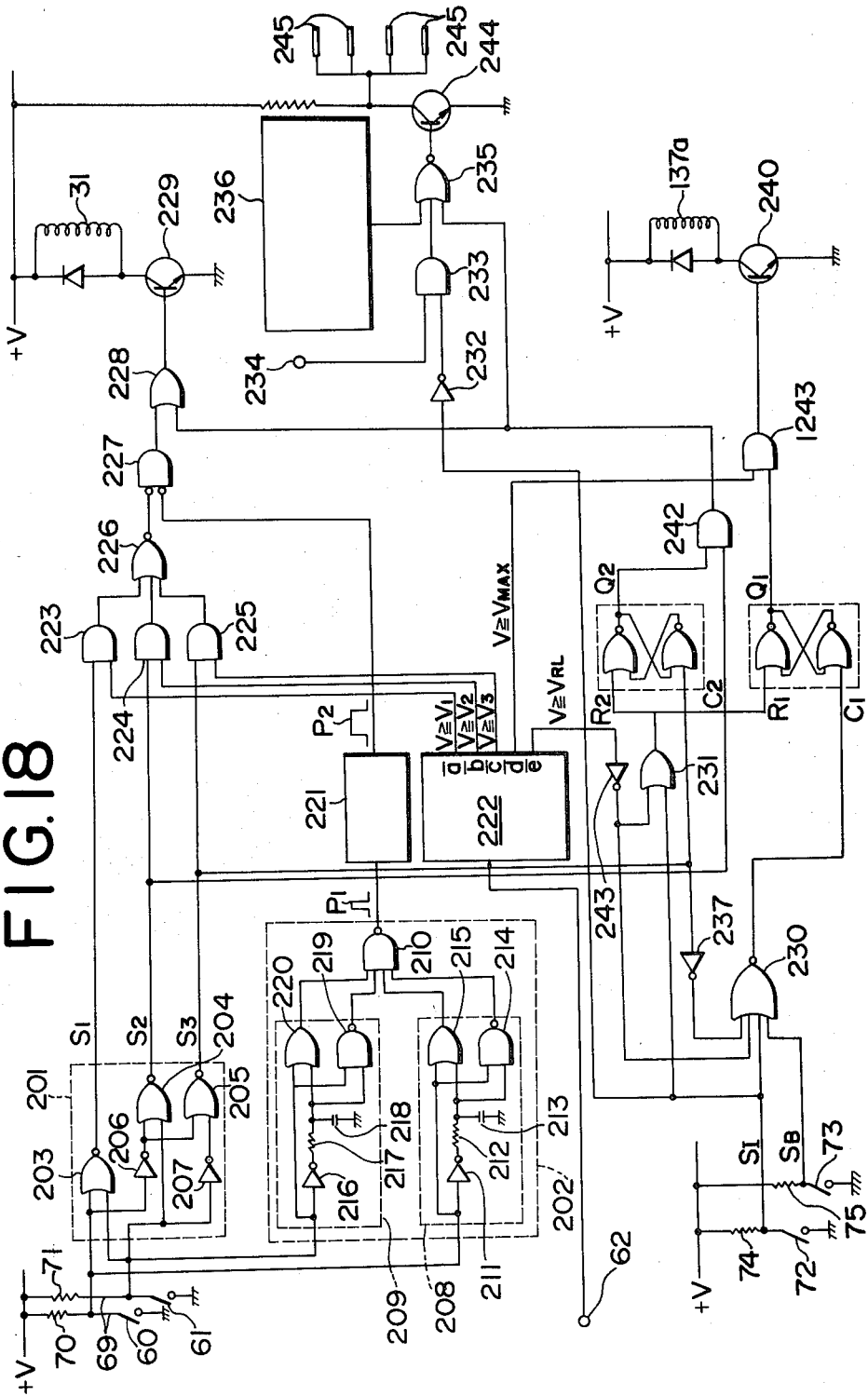
FIG. 18 is a block diagram of a modified embodiment of FIG. 17 embodiment.

In the previously described embodiments, even during high speed highway driving, the forced downshift, lock-up and fuel cut-off are initiated as long as the vehicle speed is higher than $V_{RH}$ and the other conditions are satisfied. However, this causes a great engine braking and an extremely great shock to take place if the forced downshift is initiated during highway driving at high vehicle speeds. To prevent this, a vehicle speed comparator circuit 222 is provided, as shown in FIG. 18, with a gate $\bar{d}$ and is designed to generate a H level signal from the gate $\bar{d}$ when the vehicle speed is lower than a predetermined vehicle speed value $V_{MAX}$. An AND gate 1243 is provided which performs an AND operation between this signal and the H level signal issued from the output terminal $Q_1$ of the flip-flop 239 so as to effect on-off control of the transistor 240. The predetermined vehicle speed value $V_{MAX}$ is selected to be a value as shown in FIG. 9 which is slightly higher than the vehicle speed value $V_{RH}$.

According to this embodiment, as an additional condition for initiating forced downshift, $V \geq V_{MAX}$ has been added so that the forced downshift is initiated only when $V_{RL} \leq V < V_{MAX}$, thus preventing the occurrence of a great shock during high speed highway driving. Further, as will be understood from the preceding description, since the AND gate 242 will not issue a H level signal before the forced downshift has been completed, there is no possibility that a forced lock-up and a fuel cut-off will take place before the completion of the forced downshift.

Figure 19:
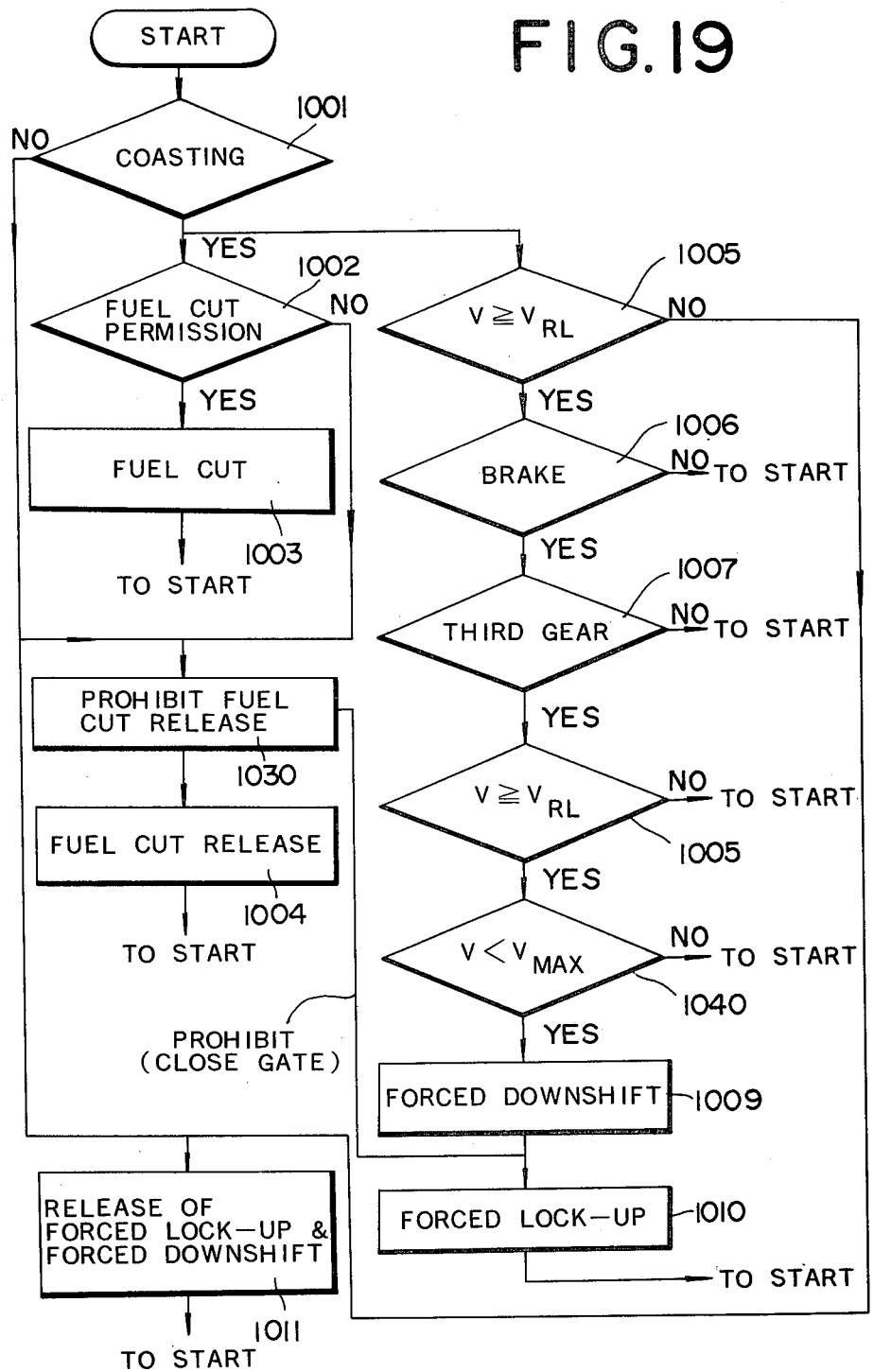
FIG. 19 is a flow diagram implementing the embodiment shown in FIG. 18.

FIG. 19 is a flow diagram implementing the embodiment shown in FIG. 18. This flow diagram is substantially similar to that shown in FIG. 17 except that a decision step 1040 is provided after a decision step 1005. In the step 1040, a decision is made whether or not the vehicle speed V is lower than $V_{MAX}$ and if the answer is YES, a forced downshift signal is generated in a step 1009.

In the previous embodiments, the predetermined vehicle speed value $V_{RL}$ (see FIG. 9) is set higher than a 2-1 downshift vehicle speed value $V_{21}$ (see FIG. 7) at which a 2-1 downshift is to take place when the transmission is in the forced downshift state, so as to release the fuel cut-off before the transmission selects the first gear ratio.

Fuel cut-off in the first gear ratio must be prohibited. When the transmission shifts into the first gear ratio with the engine being supplied with no fuel, the engine will not start even if the fuel is supplied again. This is because no power flow path from the traction wheels to the engine is established through the transmission when the transmission is in the first gear ratio during coasting because the one-way clutch 108 (see FIG. 1) does not provide a reaction under this condition.

Hence, it is the common practice to set $V_{RL}$ at a relatively high vehicle speed value so as to prevent the fuel cut-off from taking place during coasting in the first gear ratio. Furthermore, the vehicle speed value $V_{RL}$ must be set sufficiently high to prevent the fuel cut-off from taking place during operation in the first gear ratio even if there is a variation in downshifting point into the first gear ratio.

Figure 20:
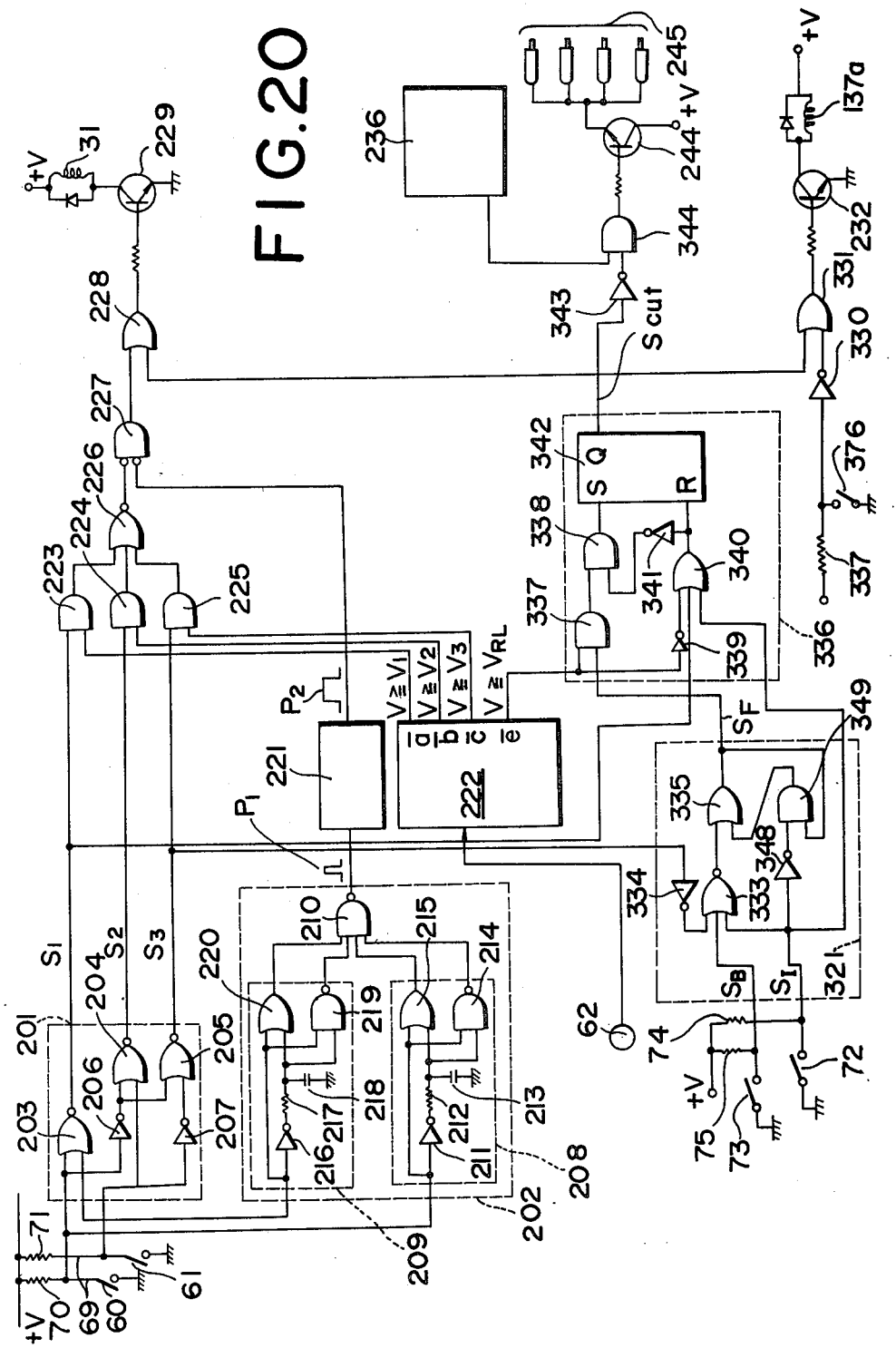
FIG. 20 is a block diagram of an embodiment of a control system according to the present invention.

The embodiment shown in FIG. 20 has solved the above-mentioned problem by providing a fuel cut-off prohibiting means responsive to the first gear ratio signal $S_1$ for preventing operation of the fuel cut-off when the transmission selects the first gear ratio.

Referring to FIG. 20, a control system includes a lock-up control circuit substantially the same as that used in the previously described control system shown in FIG. 4. In FIG. 20, the control system includes a kickdown switch 376 which is operatively connected with the accelerator pedal and is closed or rendered ON during a kickdown range (see FIG. 6) when the accelerator pedal is depressed deeply to a level just before the fully opened position. The kickdown switch 376 is connected with the power supply +V via the resistor 377, thus the kickdown switch 376 issues a L level signal during operation within the kickdown range, this signal is fed, after being inverted by a NOT gate 330, to the base of a transistor 232 through a NOR gate 331. This causes the transistor 232 to become conductive, thus energizing with the power source +V a downshift solenoid 137a to cause a downshift to take place in the automatic transmission. Outside of the kickdown range the kickdown switch 376 is opened and issues a H level signal, preventing the occurrence of kickdown operation.

The above-mentioned lock-up control circuit and kickdown control circuit are provided additionally with an idle switch 72 and a brake switch 73, which switches are connected with the power source +V through the resistors 74 and 75, respectively. The idle signal $S_I$ and brake signal $S_B$ are fed to a braking memory circuit 321 at a NOR gate 333. To the NOR gate 333, a H level third gear ratio signal $S_3$ is fed after having been inverted by a NOT gate 334. The NOR gate 333 issues a H level signal upon depression of the brake pedal after the accelerator pedal has been released to cause the vehicle to begin a coasting operation in the third gear ratio because all of the three inputs are L level. The H level signal issued by the NOR gate 333 is fed to an OR gate 335 to cause this OR gate to issue a fuel cut-off permission signals $S_F$ having a H level. This H level signal is fed to an AND gate 337 of a fuel cut-off decision circuit 336. The AND gate 337 is fed also with a signal from a gate $\bar{e}$ of a vehicle speed comparator circuit 222. The vehicle speed comparator circuit 222 compares the vehicle speed signal V from a vehicle speed sensor 62 with a predetermined vehicle speed value $V_{RL}$ and issues from the gate $\bar{e}$ a H level signal when $V \geq V_{RL}$ (see FIG. 9). The AND gate 337 issues a H level signal when the vehicle speed is higher than the predetermined vehicle speed value $V_{RL}$ as long as the H level fuel cut-off permission signal $S_F$ is fed thereto. The output of the AND gate 337 is fed to an AND gate 338. The H level signal issued at the gate $\bar{e}$ of the vehicle speed comparator circuit 222 is fed after being inverted by a NOT gate 239 to a L level to an OR gate 340. Since the other two inputs of the OR gate 340, viz., the first gear ratio signal $S_1$ and idle signal $S_I$, are L levels, the OR gate 340 issues a L level signal. This L level signal is fed, after being inverted by a NOT gate 341 to a H level, to the AND gate 338. This L level signal is fed to a reset terminal R of a flip-flop 342. Thus, the AND gate 338 feeds a H level to set terminal S of the flip-flop 342 to set the flip-flop 342. When it is set, the flip-flop 342 issues from an output terminal Q thereof a H level fuel cut-off signal Scut. This signal is fed after being inverted by a NOT gate 343 to a L level to an AND gate 344, thus preventing the AND gate 344 from allowing the fuel injection pulse generated by a fuel injection control unit 236 to be fed to the base of a transistor 244 (fuel cut-off). When the fuel cut-off signal Scut disappears and the NOT gate 343 starts to feed a H level signal to the AND gate 344, the supply of fuel is resumed.

The above-mentioned fuel cut-off signal Scut is fed also to OR gates 228 and 331, causing these OR gates to issue H level signals to render the transistors 229 and 232 conductive, and as a result, the lock-up solenoid 31 is energized to effect a lock-up state and the downshift solenoid 137a is energized to cause a forced downshift.

Although the fuel cut-off of the electronic control type fuel injection engine has been described in the illustrated embodiments, a carburetor injection engine can be used with a fuel cut-off device wherein a fuel cut-off valve is provided in a fuel supply passage of the carburetor to selectively shut off the passage and this valve is directly operated by the fuel cut-off signal Scut to suspend the supply of fuel.

As described before, when the downshift solenoid 137a is energized, a gear change in the automatic transmission takes place according to a schedule shown in FIG. 7. During coasting operation, since the accelerator pedal is released and the throttle opening degree is zero, a forced downshift from the third gear ratio to the second gear ratio and a downshift from the second gear ratio to the first gear ratio occur at vehicle speed values $V_{32}$ and $V_{21}$, respectively, (see FIG. 7).

Once the fuel cut-off signal Scut is issued, since the AND gate 349 keeps on feeding a H level signal to an OR gate 335, the OR gate 335 keeps on issuing a H level fuel cut-off permission signal $S_F$ even after the third gear ratio signal $S_3$ has disappeared or the brake signal $S_B$ has disappeared. Thus, in this state, the fuel cut-off signal Scut continues to exist, thereby preventing the release of fuel cut, forced downshift and forced lock-up. This state holds until the driver depresses the accelerator pedal for acceleration.

When the L level idle signal $S_I$ changes to a H level upon depression of the accelerator pedal, or the H level first gear ratio signal $S_1$ appears, or a L level signal appears on the gate $\bar{e}$ of the vehicle speed comparator circuit 222, the OR gate 340 issues a H level signal. This H level signal is fed to a reset terminal R of the flip-flop 342. The H level signal issued by the NOR gate 340 is fed after being inverted by the NOT gate 341 to a L level to the AND gate 338, causing the AND gate 338 to issue a L level signal. The flip-flop 342 changes its state to issue a L level signal when the H level signal is fed to the reset terminal R thereof from the OR gate 340, thus causing the fuel cut signal Scut to disappear.

It will be understood that when the first gear ratio signal $S_1$ appears in response to the selection of the first gear ratio by the automatic transmission, the forced downshift state and lock-up state are released. Thus, it is now free to set the predetermined vehicle speed $V_{RL}$ at as low a vehicle speed as possible, at which the engine can be restarted upon resumption of the fuel supply, thus elongating the time period of operation of the fuel cut-off.

Figure 21:
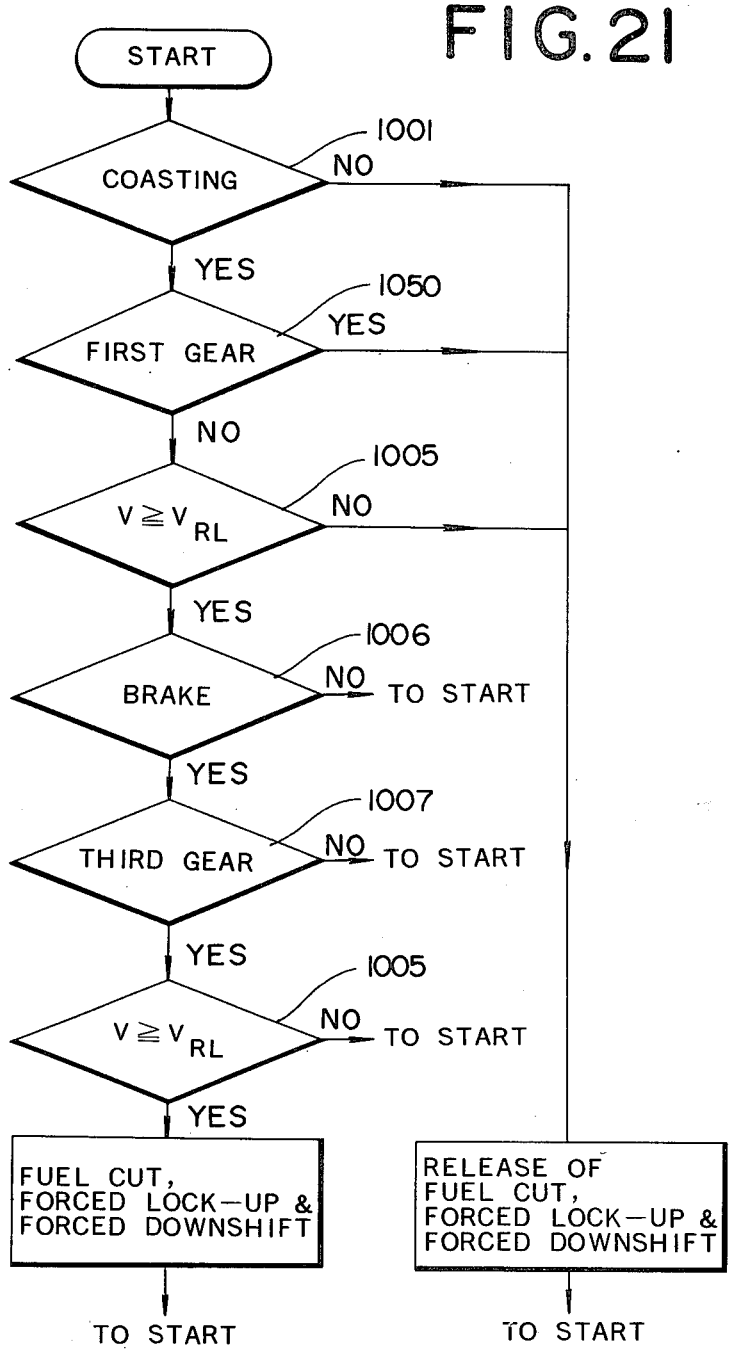
FIG. 21 is a flow diagram implementing the embodiment shown in FIG. 20.

FIG. 21 is a flow diagram implementing the embodiment shown in FIG. 20. A decision is made in a step 1001 whether or not the vehicle is coasting. If the answer is YES, a decision is made in a step 1050 whether or not the transmission is in the first gear ratio. If the answer of this decision is YES, the fuel cut-off, forced downshift and lock-up states are released. If the answer of the decision step 1050 is NO, a decision is made in a step 1005 whether or not the vehicle speed is higher than $V_{RL}$. If the answer of this decision step is YES, the three decision steps 1006, 1007 and 1005 are performed in this order. It will be noted from the flow chart that the release of the fuel cut-off, forced downshift and lock-up are carried out when the answer of the decision step 1001 is NO or the answer of the decision step 1050 is YES or the answer of the decision step 1005 is NO.

Figure 22:
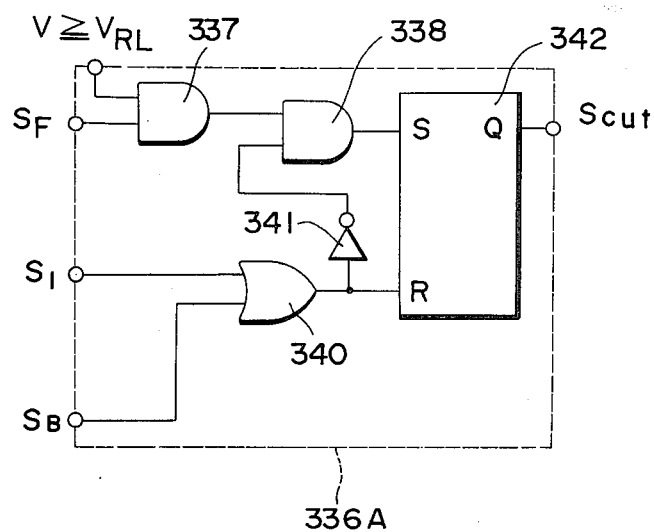
FIG. 22 is a block diagram of a portion of FIG. 20 showing a modification of a fuel cut decision circuit.

FIG. 22 shows another example of a fuel cut-off decision circuit 336 shown in FIG. 20. A fuel cut-off decision circuit 336A is designed for use with an automatic transmission wherein a 2-1 downshift vehicle speed $V_{21}$ (see FIG. 7) is higher than a predetermined vehicle speed $V_{RL}$. This circuit 336A is different from the corresponding circuit 226 in the embodiment shown in FIG. 20 in that among the conditions for releasing the fuel cut-off which are fed to an OR gate 340 a vehicle speed condition ($V \geq V_{RL}$) has been eliminated i.e., no OR gate, corresponding to the gate 340 of FIG. 20 is connected to the gate e of the speed comparator circuit 222.

What is claimed is:

1. A control system for an automatic transmission for an automotive vehicle having an engine, an accelerator pedal and a brake pedal, the automatic transmission being adapted for shifting between different gear ratios including a high gear ratio according to a shift pattern, and including an output member drivingly connected to at least one traction wheel of the automotive vehicle and a torque converter including a pump drivingly connected to the engine, the engine having fuel cut-off signal generating means for generating a fuel cut-off signal whenever the engine speed is higher than a predetermined engine speed value after the accelerator pedal has been released to cause the automotive vehicle to begin a coasting operation, and a fuel cut-off means responsive to the fuel cut-off signal for suspending the supply of fuel to the engine, said control system comprising:
    a brake pedal position detector operatively coupled to the brake pedal for generating a brake signal when the brake pedal is depressed;
    circuit means responsive to said brake signal for generating a downshift command signal when depressing the brake pedal after the accelerator pedal has been released thereby causing the automotive vehicle to begin said coasting operation; and
    downshift means responsive to said downshift command signal for shifting the automatic transmission from the high gear ratio down to the next lower adjacent gear ratio to increase the engine speed, resulting in an increase in a time period during which the engine speed will remain above the predetermined engine speed value to increase the time period of the operation of the fuel cut-off means thereby improving fuel economy.

2. A control system as claimed in claim 1, wherein said fuel cut-off signal and said downshift command signal are generated by a microprocessor.

3. A control system as claimed in claim 1, further comprising:
    gear ratio generating means responsive to the automatic transmission for generating a high gear ratio signal when the automatic transmission selects the high gear ratio;
    an accelerator pedal position detector means responsive to the accelerator pedal for generating an idle signal when the accelerator pedal is released;
    engine speed related value generating means for generating an engine speed related value which varies as a function of the engine speed and the gear ratio selected by the automatic transmission;
    comparator means for comparing said engine speed related value with a predetermined engine speed related reference value and for generating a range signal when said engine speed related value is greater than said engine speed related reference value,
    wherein said circuit means is further responsive to said idle signal, said range signal and said high gear ratio signal.

4. A control system as claimed in claim 3, wherein said engine speed related value is a vehicle speed of the automotive vehicle, said vehicle speed being determined by an engine speed vs., vehicle speed for the high gear ratio.

5. A control system as claimed in claim 3, wherein said engine speed related value is an engine speed of the engine.

6. A control system as claimed in claim 1, wherein said circuit means is responsive to the fuel cut-off signal to determine that the fuel cut-off means suspends the supply of fuel to the engine.

7. A control system as claimed in claim 6, wherein said circuit means includes a flip-flop circuit which is set by said brake signal when said fuel cut-off signal is present and remains set as long as said fuel cut-off signal is present even after said brake signal has terminated.

8. A control system as claimed in claim 6, including:
    reference engine speed value generating means responsive to engine coolant temperature for generating a reference engine speed value varying in response to said engine coolant temperature;
    engine speed sensor for generating an engine speed signal representing the engine speed;
    comparator means for comparing said engine speed signal with said reference engine speed value and for generating a fuel cut-off permission signal when said engine speed signal is greater than said reference engine speed value;
    said fuel cut-off means generating said fuel cut-off signal at least in response to said fuel cut-off permission signal; and
    a holding circuit means for maintaining said fuel cut-off permission signal for a predetermined time period independent of the engine speed signal whereby even if said engine speed drops below said reference engine speed value for said predetermined time period, said fuel cut-off permission signal is generated.

9. A control system as claimed in claim 1, further comprising:
    means for generating a lock-up command signal when said downshift means has changed the transmission from the high gear ratio down to the next lower adjacent gear ratio; and
    lock-up means responsive to said lock-up command signal for locking up the torque converter.

10. A control system as claimed in claim 9, including:
    means responsive to said lock-up command signal for causing the fuel cut-off means to suspend the supply of fuel to the engine.

11. A control system as claimed in any one of claims 1–9, including:
    means for generating a downshift prohibiting signal when the vehicle speed is higher than a downshift prohibiting vehicle speed value; and means responsive to said downshift prohibiting signal for preventing the issuance of said downshift command signal as long as said downshift prohibiting signal is present.

12. A control system as claimed in claim 1, including gear ratio generating means for generating a gear ratio signal when the automatic transmission selects a predetermined gear ratio signal; and fuel cut-off prohibiting means responsive to said gear ratio signal for preventing operation of said fuel cut-off means.

13. A control method for an automatic transmission for an automotive vehicle having an engine, an accelerator pedal and a brake pedal, the automatic transmission being adapted for shifting between different gear ratios including a high gear ratio according to a shift pattern, and including an output member drivingly connected to at least one traction wheel of the automotive vehicle and a torque converter including a pump drivingly connected to the engine, the engine having fuel cut-off signal generating means for generating a fuel cut-off signal whenever the engine speed is higher than a predetermined speed value after the accelerator pedal has been released to cause the automotive vehicle to begin a coasting operation and a fuel cut-off means responsive to the fuel cut-off signal for suspending the supply of fuel to the engine, said control method comprising:

generating a brake signal responsive to the brake pedal when the brake pedal is depressed;

generating a downshift command signal responsive to said brake signal when depressing the brake pedal after the accelerator pedal has been released to cause said automotive vehicle to begin said coasting operation; and shifting the automatic transmission from the high gear ratio down to the next lower adjacent gear ratio in response to said downshift command signal to increase the engine speed, resulting in an increase in a time period during which the engine speed value remains above the predetermined engine speed to increase the time period of operation of the fuel cut-off means thereby improving fuel economy.

14. A control method as claimed in claim 13, further comprising:

generating a high gear ratio signal responsive to the automatic transmission when the automatic transmission selects the high gear ratio;

generating an idle signal responsive to the accelerator pedal when the accelerator pedal is released;

generating an engine speed related value which varies as a function of the engine speed and the gear ratio selected by the automatic transmission;

comparing said engine speed related value with a predetermined engine speed related reference value to generate a range signal when said engine speed related value is higher than said engine speed related reference value.

15. A control method as claimed in claim 13, further comprising:

generating a reference engine speed value which varies in response to said engine coolant temperature;

generating an engine speed signal representing the engine speed;

comparing said engine speed signal with said reference engine speed signal to generate a fuel cut-off permission signal when said engine speed signal is greater than said reference engine speed value;

said fuel cut-off signal being generated at least in response to said fuel cut-off permission signal; and maintaining said fuel cut-off permission signal for a predetermined time period which is independent of the engine speed signal whereby even if said engine speed drops below said reference engine speed value for said predetermined time period, said fuel cut-off permission signal is generated.

16. A control method as claimed in claim 13, further comprising:

generating a lock-up command signal in response to said downshift command signal; and locking up the torque converter in response to said lock-up command signal.

17. A control method as claimed in any one of claims 13-16, further comprising:

generating a downshift prohibiting signal when the vehicle speed is higher than a downshift prohibiting value; and preventing the issuance of said downshift command signal in response to said downshift prohibiting signal as long as said downshift prohibiting signal is present.

18. A control method as claimed in claim 13, further comprising:

generating a gear ratio signal when the automatic transmission selects a predetermined gear ratio; and preventing operation of said fuel cut-off means in response to said gear ratio signal.

19. A control system for an automatic transmission for an automotive vehicle having an engine, an accelerator pedal and a brake pedal, the automatic transmission being adapted for shifting between different gear ratios according to a shift pattern, and including an output member drivingly connected to at least one traction wheel of the automotive vehicle and a torque converter including a pump drivingly connected to the engine, the engine having a fuel cut-off signal generating means for generating a fuel cut-off signal whenever the engine speed is higher than a predetermined engine speed value after the accelerator pedal has been released to cause the automotive vehicle to begin a coasting operation, and a fuel cut-off means responsive to the fuel cut-off signal for suspending the supply of fuel to the engine, said control system comprising:

a brake pedal position detector operatively coupled to the brake pedal for generating a brake signal when the brake pedal is depressed;

circuit means responsive to said brake signal for generating a downshift command signal whenever the engine operates at an engine speed higher than the predetermined engine speed value when depressing the brake pedal after the accelerator pedal has been released to cause the vehicle to begin said coasting operation; and downshift means responsive to said downshift command signal for forcing the automatic transmission to downshift to increase the engine speed, resulting in an increase in a time period during which the engine speed remains above the predetermined engine speed value to increase the time period of operation of the fuel cut-off means thereby improving fuel economy.

20. A control method for an automatic transmission for an automotive vehicle having an engine, an accelerator pedal and a brake pedal, the automatic transmission being adapted for shifting between different gear ratios including a high gear ratio according to a shift pattern, and including an output member drivingly connected with at least one traction wheel of the automotive vehicle and a torque converter including a pump drivingly connected to the engine, the engine having fuel cut-off signal generating means for generating a fuel cut-off signal whenever the engine speed is higher than a predetermined engine speed value after the accelerator pedal has been released to cause the automotive vehicle to begin a coasting operation and a fuel cut-off means responsive to the fuel cut-off signal for suspending the supply of fuel to the engine, said control system comprising:

generating a brake signal responsive to the brake pedal when the brake pedal is depressed;

generating a downshift command signal responsive to said brake signal when the engine operates at an engine speed higher than said predetermined engine speed value when depressing the brake pedal after the accelerator pedal has been released to cause the vehicle to begin said coasting operation; and forcing the automatic transmission to downshift in response to said downshift command signal to increase the engine speed, resulting in an increase in a time period during which the engine speed remains above the predetermined engine speed value to increase the time period of operation of the fuel cut-off means thereby improving fuel economy.

21. A control system for an automotive vehicle having an engine, an accelerator pedal for the engine, a brake pedal, and an automatic transmission, the automatic transmission including a torque converter having a pump drivingly connected to the engine and an output member drivingly connected to at least one traction wheel of the automotive vehicle, the automatic transmission being shiftable between different gear ratios, said control system comprising:

an accelerator pedal position detector operatively coupled to the accelerator pedal for generating an idle signal when the accelerator pedal is released;

a brake pedal position detector operatively coupled to the brake pedal for generating a brake signal when the brake pedal is depressed;

a fuel cut-off means responsive to said idle signal for suspending the supply of fuel to the engine whenever the engine operates in a predetermined state after the accelerator pedal has been released thereby causing the automotive vehicle to begin a coasting operation; and a downshift means, responsive to said brake signal and said idle signal, for downshifting the automatic transmission whenever the engine operates in said predetermined state when depressing the brake pedal after the accelerator pedal has been released to cause the automotive vehicle to begin said coasting operation.

22. A control system as claimed in claim 21, wherein said predetermined state comprises a state wherein the engine operates at a speed higher than a predetermined engine speed value.

23. A control system for an automotive vehicle having an engine, an accelerator pedal for the engine, a brake pedal and an automatic transmission, the automatic transmission including a torque converter having a pump drivingly connected to the engine and an output member drivingly connected to at least one traction wheel of the automotive vehicle, the automatic transmission being shiftable between different gear ratios including a predetermined gear ratio, said control system comprising:

an accelerator pedal position detector operatively coupled to the accelerator pedal for generating an idle signal when the accelerator pedal is released;

a brake pedal position detector operatively coupled to the brake pedal for generating a brake signal when the brake pedal is depressed;

means operatively coupled to the automatic transmission for generating a gear ratio signal indicative of said predetermined gear ratio;

means for generating a vehicle speed signal indicative of a vehicle speed of the automotive vehicle;

a comparator means for comparing said vehicle speed signal with a predetermined reference vehicle speed value and for generating a range signal when said vehicle speed signal is greater than said reference vehicle speed value;

means responsive to said idle signal for generating a fuel cut-off signal whenever the engine operates in a predetermined state after the accelerator pedal has been released thereby causing the automotive vehicle to begin a coasting operation;

a fuel cut-off means responsive to said fuel cut-off signal for suspending the supply of fuel to the engine;

means responsive to said gear ratio signal, said brake signal, said idle signal and said range signal for generating a downshift command signal whenever said gear ratio signal and said range signal are present when depressing the brake pedal after the accelerator pedal has been released to cause said automotive vehicle to begin said coasting operation; and a downshift means, responsive to said downshift command signal for downshifting the automatic transmission from the predetermined gear ratio to a lower gear ratio.

24. A control system for an automotive vehicle having an engine, an accelerator pedal for the engine, a brake pedal and an automatic transmission, the automatic transmission including a torque converter having a pump drivingly connected to the engine and an output member drivingly connected to at least one traction wheel of the automotive vehicle, the automatic transmission being shiftable between different gear ratios, said control system comprising:

an accelerator pedal position detector operatively coupled to the accelerator pedal for generating an idle signal when the accelerator pedal is released;

a brake pedal position detector operatively coupled to the brake pedal for generating a brake signal when the brake pedal is released;

means, responsive to said idle signal for generating a fuel cut-off signal whenever the engine operates in a predetermined state after the accelerator pedal has been released thereby causing the automotive vehicle to begin a coasting operation;

a fuel cut-off means responsive to said fuel cut-off signal for suspending the supply of fuel to the engine;

means responsive to said brake signal and said fuel cut-off signal for generating a downshift command signal whenever said fuel cut-off signal is present after depressing the brake pedal;

a downshift means responsive to said downshift command signal for downshifting the automatic transmission.

25. A control system as claimed in claim 24, wherein said downshift command signal generating means includes means operatively coupled to said brake pedal position detector for receiving said brake signal and also to said fuel cut-off signal generating means for receiving said fuel cut-off signal and operable for generating said downshift command signal whenever said fuel cut-off signal is present after releasing the brake pedal after the brake pedal has been depressed.

26. A control system as claimed in claim 24, wherein said predetermined state comprises a state wherein the engine operates at a speed higher than a predetermined engine speed value.

27. A control system as claimed in claim 26, wherein said fuel cut-off signal generating means includes means for maintaining said fuel cut-off signal for a predetermined period of time after said engine speed has dropped below said predetermined engine speed value.

28. A control system for an automotive vehicle having a engine, an accelerator pedal and an automatic transmission, the automatic transmission including a torque converter having a pump drivingly connected to the engine and an output member drivingly connected to at least one traction wheel of the automotive vehicle, the automatic transmission being shiftable between different gear ratios, said control system comprising:
- an accelerator pedal position detector operatively coupled to the accelerator pedal for generating an idle signal when the accelerator pedal is released;
- a brake pedal position detector operatively coupled to the brake pedal for generating a brake signal when the brake pedal is depressed;
- means for generating an engine coolant temperature signal indicative of a coolant temperature of the engine;
- means responsive to said engine coolant temperature signal for generating a reference engine speed signal which varies according to said engine coolant temperature signal;
- means for generating an engine speed signal indicative of an engine speed of the engine;
- a comparator for comparing said engine speed signal with said reference engine speed and generating a fuel cut-off signal permission signal when said engine speed signal is greater than said reference engine speed signal;
- means responsive to said fuel cut-off permission signal and said idle signal for generating a fuel cut-off signal in response at least to said fuel cut-off permission signal;
- means for maintaining said fuel cut-off permission signal for a predetermined period of time after said engine speed signal has dropped below said reference engine speed signal;
- a fuel cut-off means responsive to said fuel cut-off signal for suspending the supply of fuel to the engine;
- means responsive to said brake signal and said fuel cut-off signal for generating a downshift command signal whenever said fuel cut-off signal is present after depressing the brake pedal;
- a downshift means responsive to said downshift command signal for downshifting the automatic transmission.

29. A control system for an automotive vehicle having an engine, an accelerator pedal for the engine, a brake pedal and an automatic transmission, the automatic transmission including a lock-up type torque converter having a pump drivingly connected to the engine and an output member drivingly connected to at least one traction wheel of the automotive vehicle, the automatic transmission being shiftable between different gear ratios, said control system comprising:
- an accelerator pedal position detector operatively coupled to the accelerator pedal for generating an idle signal when the accelerator pedal is released;
- a brake pedal position detector operatively coupled to the brake pedal for generating a brake signal when the brake pedal is depressed;
- means responsive to said idle signal for generating a fuel cut-off signal whenever the engine operates in a predetermined state after the accelerator pedal has been released thereby causing the automotive vehicle to begin a coasting operation;
- a fuel cut-off means responsive to said fuel cut-off signal for suspending the supply of fuel to the engine;
- means responsive to said brake signal for generating a downshift command signal when depressing the brake pedal after the accelerator pedal has been released;
- a downshift means responsive to said downshift command signal for downshifting the automatic transmission;
- means responsive to said downshift command signal for generating a lock-up command signal; and
- a lock-up means responsive to said lock-up command signal for causing the torque converter to lock up.

30. A control system for an automotive vehicle having an engine, an accelerator pedal for the engine, a brake pedal and an automatic transmission, the automatic transmission including a torque converter having a pump drivingly connected to the engine and an output member drivingly connected to at least one traction wheel of the automotive vehicle, the automatic transmission being shiftable between different gear ratios, said control system comprising:
- an accelerator pedal position detector operatively coupled to the accelerator pedal for generating an idle signal when the accelerator pedal is released;
- a brake pedal position detector operatively coupled to the brake pedal for generating a brake signal when the brake pedal is depressed;
- a fuel cut-off means responsive to said idle signal for suspending the supply of fuel to the engine whenever the engine operates in a predetermined state after the accelerator pedal has been released;
- means responsive to said idle signal and said brake signal for generating a downshift command when depressing the brake pedal after the accelerator pedal has been released whenever the engine operates in said predetermined state;
- means for generating a vehicle speed signal;
- means for generating a downshift prohibiting signal when said vehicle speed signal is greater than a downshift prohibiting vehicle speed value;
- means for preventing said downshift signal generating means from generating said downshift command signal as long as said downshift prohibiting signal is present;

a downshift means responsive to said downshift command signal for downshifting the automatic transmission.

31. A control system for an automotive vehicle having an engine, an accelerator pedal for the engine, a brake pedal and an automatic transmission, the automatic transmission including a torque converter having a pump drivingly connected to the engine and an output member drivingly connected to at least one traction wheel of the automotive vehicle, the automatic transmission being shiftable between different gear ratios including a lowest gear ratio, said control system comprising:

an accelerator pedal position detector operatively coupled to the accelerator pedal for generating an idle signal when the accelerator pedal is released;
a brake pedal position detector operatively coupled to the brake pedal for generating a brake signal when the brake pedal is depressed;
means responsive to said idle signal for generating a fuel cut-off permission signal as long as the engine operates in a predetermined state after the accelerator pedal has been released;
means for generating a gear ratio signal when the automatic transmission selects the lowest gear ratio;
means responsive to said gear ratio signal for generating a prohibiting signal;
a fuel cut-off means responsive to said fuel cut-off permission signal and said prohibiting signal for suspending the supply of fuel to the engine whenever the engine operates in a predetermined state after the accelerator pedal has been released unless said prohibiting signal is present; and
a downshift means responsive to said brake signal and said idle signal for downshifting the automatic transmission when depressing the brake pedal after the accelerator pedal has been released.

32. A control system for an automotive vehicle having an engine, an accelerator pedal for the engine, a brake pedal and an automatic transmission, the automatic transmission including a torque converter having a pump drivingly connected to the engine and an output member drivingly connected to at least one traction wheel of the automotive vehicle, the automatic transmission being shiftable between different gear ratios, said control system comprising:

generating, responsive to the accelerator pedal, an idle signal when the accelerator pedal is released;
generating, responsive to the brake pedal, a brake signal when the brake pedal is depressed;
suspending, responsive to said idle signal, the supply of fuel to the engine whenever the engine operates in a predetermined state after the accelerator pedal has been released thereby causing the automotive vehicle to begin a coasting operation; and
forcing, responsive to said idle signal and said brake signal, the automatic transmission to downshift as long as the engine operates in said predetermined state when depressing the brake pedal after the accelerator pedal has been released to cause the automotive vehicle to begin said coasting operation.

33. A control system for an automatic transmission for an automotive vehicle having an engine, an accelerator pedal, and a brake pedal, the automatic transmission including a torque converter having a pump drivingly connected to the engine and including an output member drivingly connected to at least one traction wheel of the automotive vehicle, the automatic transmission being shiftable between different gear ratios, said control system comprising:

an accelerator pedal position detector operatively coupled to the accelerator pedal for generating an idle signal when the accelerator pedal is released;
a brake pedal position detector operatively coupled to the brake pedal for generating a brake signal when the brake pedal is depressed;
a microprocessor operatively coupled to said accelerator pedal position detector and said brake pedal position detector for generating a fuel cut-off signal whenever the engine operates in a predetermined state after the accelerator pedal has been released, thereby causing the automotive vehicle to begin a coasting operation and also for generating a downshift command signal as long as the engine operates in said predetermined state when depressing the brake pedal after the accelerator pedal has been released to cause the automotive vehicle to begin said coasting operation;
a fuel cut-off means operatively coupled to said microprocessor for suspending the supply of fuel to the engine in response to said fuel cut-off signal; and
a downshift means, operatively coupled to said microprocessor, for forcing the automatic transmission to downshift in response to said downshift command signal.

* * * * *